US012812252B2

(12) United States Patent
Hu

(10) Patent No.: US 12,812,252 B2
(45) Date of Patent: Nov. 24, 2026

(54) METHOD AND APPARATUS FOR CONTROLLING ANGLE OF VIEW OF VEHICLE-MOUNTED CAMERA, AND VEHICLE

(71) Applicant: Yinwang Intelligent Technologies Co., Ltd., Shenzhen (CN)

(72) Inventor: Wenxiao Hu, Shenzhen (CN)

(73) Assignee: YINWANG INTELLIGENT TECHNOLOGIES CO., LTD., Shenzhen (CN)

( * ) Notice: Subject to any disclaimer, the term of this patent is extended or adjusted under 35 U.S.C. 154(b) by 122 days.

(21) Appl. No.: 18/616,823

(22) Filed: Mar. 26, 2024

(65) Prior Publication Data

US 2024/0236494 A1 Jul. 11, 2024

Related U.S. Application Data

(63) Continuation of application No. PCT/CN2021/121303, filed on Sep. 28, 2021.

(51) Int. Cl.
*H04N 23/69* (2023.01)
*B60W 60/00* (2020.01)
*H04N 23/695* (2023.01)

(52) U.S. Cl.
CPC .......... *H04N 23/69* (2023.01); *B60W 60/001* (2020.02); *H04N 23/695* (2023.01);
(Continued)

(58) Field of Classification Search
CPC ........ H04N 23/58; H04N 23/60; H04N 23/69; H04N 23/695; H04N 23/698; B60W 40/076; B60W 40/105; B60W 60/001; B60W 2520/06; B60W 2520/10; B60W 2520/14; B60W 2420/403; B60W 2540/18; B60W 2552/15; B60W 2554/802; B60R 1/00; B60R 1/20; B60R 1/22; B60R 1/28; B60R 2300/101; B60R 2300/602; B60R 2300/605; G06V 20/56
See application file for complete search history.

(56) References Cited

U.S. PATENT DOCUMENTS 11,703,326 B2 * 7/2023 Ohara ...................... G01C 3/14 348/47
2014/0267585 A1 * 9/2014 Chen .................... H04N 23/698 348/36

(Continued)

FOREIGN PATENT DOCUMENTS

CN 103101497 A 5/2013
CN 104554060 B * 9/2017 .......... B60W 30/045

(Continued)

OTHER PUBLICATIONS

English translation of CN104554060 (Year: 2017).*
English Translation of KR 20090035822 (Year: 2009).*

*Primary Examiner* — Brandon Z Willis
(74) *Attorney, Agent, or Firm* — Conley Rose, P.C.

(57) ABSTRACT

A method and an apparatus for controlling an angle of view of a vehicle-mounted camera includes obtaining a real-time status parameter of a vehicle, where the real-time status parameter is used to indicate a real-time driving status of the vehicle; and controlling the angle of view of the camera of the vehicle based on the real-time status parameter.

20 Claims, 15 Drawing Sheets

(52) U.S. Cl.
CPC ... *B60W 2420/403* (2013.01); *B60W 2520/06* (2013.01); *B60W 2520/10* (2013.01); *B60W 2554/802* (2020.02)

(56) References Cited

U.S. PATENT DOCUMENTS

| | | | | |
|---|---|---|---|---|
| 2014/0267727 | A1 * | 9/2014 | Alaniz | H04N 7/183<br>348/148 |
| 2017/0320436 | A1 * | 11/2017 | VanVuuren | B60R 1/28 |
| 2020/0148113 | A1 * | 5/2020 | Coburn | H04N 7/181 |
| 2020/0276933 | A1 * | 9/2020 | Chen | B60R 1/27 |

FOREIGN PATENT DOCUMENTS

| | | | | | |
|---|---|---|---|---|---|
| CN | 109835256 | A | | 6/2019 | |
| CN | 110395184 | A | | 11/2019 | |
| JP | H10175482 | A | | 6/1998 | |
| JP | 2006178652 | A | | 7/2006 | |
| JP | 2006264574 | A | | 10/2006 | |
| JP | 2009081496 | A | | 4/2009 | |
| JP | 2018150010 | A | | 9/2018 | |
| KR | 20090035822 | A | * | 4/2009 | B60R 11/04 |
| KR | 102106572 | B1 | | 5/2020 | |

* cited by examiner

METHOD AND APPARATUS FOR CONTROLLING ANGLE OF VIEW OF VEHICLE-MOUNTED CAMERA, AND VEHICLE

CROSS-REFERENCE TO RELATED APPLICATIONS

This is a continuation of International Patent Application No. PCT/CN2021/121303 filed on Sep. 28, 2021, the disclosure of which is hereby incorporated by reference in its entirety.

TECHNICAL FIELD

The present disclosure relates to the intelligent vehicle field, furthermore, to a method and an apparatus for controlling an angle of view of a vehicle-mounted camera, and a vehicle.

BACKGROUND

As vehicles are widely used in daily lives, increasing attention is paid to vehicle driving safety. A current vehicle, especially an intelligent vehicle, is equipped with a plurality of cameras, to provide corresponding auxiliary visual information for a plurality of angles of view, thereby assisting in driving of a driver or a function such as autonomous driving of the vehicle. However, even though a quantity of cameras is increased, there may still be blind areas in different driving scenarios, especially when a driving status of a vehicle changes. In this case, an unknown risk may be caused, resulting in reduction of vehicle safety.

Therefore, how to improve driving safety of a vehicle equipped with a camera is an urgent problem to be resolved.

SUMMARY

The present disclosure provides a method and an apparatus for controlling an angle of view of a vehicle-mounted camera, and a vehicle, so that a real-time angle of view of a camera can be controlled based on a real-time status parameter obtained in a vehicle driving process, thereby improving driving safety.

According to a first aspect, a method for controlling an angle of view of a vehicle-mounted camera is provided. The method includes: obtaining a real-time status parameter of a vehicle, where the real-time status parameter is used to indicate a real-time driving status of the vehicle; and controlling the angle of view of the camera of the vehicle based on the real-time status parameter.

In this embodiment of the present disclosure, in a vehicle driving process, the status parameter can be obtained in real time, and the angle of view of the camera can be controlled in real time. Compared with a case in which an angle of view of a camera remains unchanged relative to a vehicle in a driving process, this can improve driving safety.

An angle of view of a conventional vehicle-mounted camera remains unchanged relative to a vehicle, in which case an angle and a range of a shot image also remain unchanged relative to the vehicle. As a vehicle driving status changes, such a fixed angle of view results in a blind area, which affects vehicle safety. According to the solution in this embodiment of the present disclosure, in a vehicle driving process, the angle of view of the camera can be controlled to change. In this way, auxiliary visual information with higher accuracy can be provided for driving of a driver or an autonomous driving function of the vehicle, thereby improving driving safety.

With reference to the first aspect, in some implementations of the first aspect, the controlling the angle of view of the camera of the vehicle based on the real-time status parameter includes: controlling the angle of view of the camera of the vehicle based on the real-time status parameter and a preset status parameter interval.

With reference to the first aspect, in some implementations of the first aspect, the status parameter interval includes a minimum value and a maximum value, the minimum value corresponds to a first angle of view of the camera, and the maximum value corresponds to a second angle of view of the camera; and the controlling the angle of view of the camera of the vehicle based on the real-time status parameter and a preset status parameter interval includes: if a value of the real-time status parameter is less than or equal to the minimum value, controlling the angle of view of the camera of the vehicle to be the first angle of view; or if a value of the real-time status parameter is greater than or equal to the maximum value, controlling the angle of view of the camera of the vehicle to be the second angle of view; or if a value of the real-time status parameter is greater than the minimum value and less than the maximum value, controlling the angle of view of the camera of the vehicle to be a third angle of view, where the third angle of view is obtained by performing linear interpolation on the first angle of view and the second angle of view based on the value of the real-time status parameter, the minimum value, and the maximum value.

In this embodiment of the present disclosure, the real-time angle of view of the camera is controlled based on the real-time status parameter obtained in the vehicle driving process and the maximum and minimum values in the preset status parameter interval. In this way, as a vehicle driving status changes, auxiliary visual information with higher accuracy can be provided for driving of the driver or the autonomous driving function of the vehicle, thereby improving driving safety.

With reference to the first aspect, in some implementations of the first aspect, before the controlling the angle of view of the camera of the vehicle based on the real-time status parameter and a preset status parameter interval, the method further includes: receiving configuration information of the status parameter interval; and configuring the status parameter interval based on the configuration information of the status parameter interval.

In some embodiments, the status parameter interval includes at least one of the following intervals: a speed interval of the vehicle, a steering wheel angle interval of the vehicle, and an included-angle interval between the vehicle and a horizontal plane.

With reference to the first aspect, in some implementations of the first aspect, the real-time status parameter includes a vehicle speed of the vehicle; and the controlling the angle of view of the camera of the vehicle based on the real-time status parameter includes: when the vehicle speed of the vehicle is a first vehicle speed, controlling the angle of view of the camera of the vehicle to be a fourth angle of view; or when the vehicle speed of the vehicle is a second vehicle speed, controlling the angle of view of the camera of the vehicle to be a fifth angle of view, where the first vehicle speed is lower than the second vehicle speed, and the fourth angle of view is less than or equal to the fifth angle of view.

As an example for description, in the embodiments of the present disclosure, "an angle of view is less than or equal to another angle of view" may mean a magnitude relationship between angle-of-view values, and a smaller angle of view corresponds to a smaller angle-of-view value.

In this embodiment of the present disclosure, the real-time angle of view of the camera is controlled based on a vehicle driving speed value obtained in the vehicle driving process and the preset status parameter interval. In this manner, road information with higher accuracy is provided for driving of the driver or the autonomous driving function of the vehicle in a vehicle acceleration or deceleration process, so as to help the driver or the autonomous driving function of the vehicle better adjust a driving policy, thereby improving driving safety.

With reference to the first aspect, in some implementations of the first aspect, the real-time status parameter includes an included angle between the vehicle and the horizontal plane; and the controlling the angle of view of the camera of the vehicle based on the real-time status parameter includes: when the included angle is a first included angle, controlling the angle of view of the camera of the vehicle to be a sixth angle of view; or when the included angle is a second included angle, controlling the angle of view of the camera of the vehicle to be a seventh angle of view, where the first included angle is less than the second included angle, and the sixth angle of view is higher than or equal to the seventh angle of view.

As an example for description, in the embodiments of the present disclosure, "an angle of view is higher than or equal to another angle of view" may mean a magnitude relationship between included angles between the horizontal plane and reference lines or reference planes (for example, lower sidelines, upper sidelines, median lines, or bisectors) of the angles of view. For example, the reference line is a median line. In this case, a larger included angle between a median line and the horizontal plane indicates a higher angle of view.

In this embodiment of the present disclosure, the real-time angle of view of the camera is controlled based on the included angle that is between the vehicle and the horizontal plane and that is obtained in the vehicle driving process and the preset status parameter interval. In this manner, in a process in which the vehicle runs uphill or downhill, an angle of view that is of a conventional vehicle-mounted camera and that is fixed relative to a vehicle is changed, so as to help the driver or the autonomous driving function of the vehicle better observe an uphill road condition or a downhill road condition, thereby improving driving safety.

With reference to the first aspect, in some implementations of the first aspect, the real-time status parameter includes a steering wheel angle of the vehicle; and the controlling the angle of view of the camera of the vehicle based on the real-time status parameter includes: if the steering angle is a counterclockwise-direction steering angle, controlling the angle of view of the camera of the vehicle to deflect leftward by an angle corresponding to the steering angle; or if the steering angle is a clockwise-direction steering angle, controlling the angle of view of the camera of the vehicle to deflect rightward by an angle corresponding to the steering angle, where a larger absolute value of the steering angle indicates a larger deflection angle.

As an example for description, in this embodiment of the present disclosure, that the angle of view of the camera of the vehicle deflects leftward or rightward by an angle may mean that the angle of view deflects leftward or rightward by an angle relative to a horizontal direction.

In this embodiment of the present disclosure, the real-time angle of view of the camera is controlled based on the steering wheel angle of the vehicle obtained in the vehicle driving process and the preset status parameter interval. In this manner, a fixed angle and range of an angle of view of a camera in a vehicle steering process are changed, so as to help the driver or the autonomous driving function of the vehicle better observe a surrounding environment of the vehicle in a steering process to adjust a vehicle steering policy, thereby improving driving safety.

With reference to the first aspect, in some implementations of the first aspect, the camera is a front-view camera or rear-view camera of the vehicle.

It should be understood that the foregoing example of the vehicle-mounted camera is merely an example for description. Alternatively, the vehicle-mounted camera may be a camera deployed on the top of the vehicle, or may be a camera deployed on a side of the vehicle. This is not limited in this embodiment of the present disclosure.

According to a second aspect, an apparatus for controlling an angle of view of a vehicle-mounted camera is provided. The apparatus includes: an obtaining unit configured to obtain a real-time status parameter of a vehicle, where the real-time status parameter is used to indicate a driving status of the vehicle; and a control unit configured to control the angle of view of the camera of the vehicle based on the real-time status parameter.

The apparatus provided in this embodiment of the present disclosure can obtain the status parameter in real time and control the angle of view of the camera in real time in a vehicle driving process. Compared with a case in which an angle of view of a camera remains unchanged relative to a vehicle in a driving process, this can improve driving safety.

In some embodiments, the apparatus may further include a storage unit. The storage unit may be configured to store instructions and/or data, and the control unit may read the instructions and/or data in the storage unit, so that the apparatus can perform the method in the first aspect.

In some embodiments, the control unit may be a processor, and the storage unit may be a memory. The memory may be a storage unit (for example, a register or a cache) in a chip, or may be a storage unit (for example, a read-only memory or a random access memory) that is in the vehicle and that is located outside a chip.

With reference to the second aspect, in some implementations of the second aspect, the control unit is configured to: control the angle of view of the camera of the vehicle based on the real-time status parameter and a preset status parameter interval.

With reference to the second aspect, in some implementations of the second aspect, the status parameter interval includes a minimum value and a maximum value, the minimum value corresponds to a first angle of view of the camera, and the maximum value corresponds to a second angle of view of the camera; and the control unit is configured to: if a value of the real-time status parameter is less than or equal to the minimum value, control the angle of view of the camera of the vehicle to be the first angle of view; or if a value of the real-time status parameter is greater than or equal to the maximum value, control the angle of view of the camera of the vehicle to be the second angle of view; or if a value of the real-time status parameter is greater than the minimum value and less than the maximum value, control the angle of view of the camera of the vehicle to be a third angle of view, where the third angle of view is obtained by performing linear interpolation on the first angle of view and the second angle of view based on the value of the real-time status parameter, the minimum value, and the maximum value.

In this embodiment of the present disclosure, the real-time angle of view of the camera is controlled based on the real-time status parameter obtained in the vehicle driving process and the maximum and minimum values in the preset status parameter interval. In this way, as a vehicle driving status changes, auxiliary visual information with higher accuracy can be provided for driving of a driver or an autonomous driving function of the vehicle, thereby improving driving safety.

With reference to the second aspect, in some implementations of the second aspect, the apparatus may further include a receiving unit and a configuration unit, where the receiving unit is configured to receive configuration information of the status parameter interval; and the configuration unit is configured to configure the status parameter interval based on the configuration information of the status parameter interval.

In some embodiments, the status parameter interval includes at least one of the following intervals: a speed interval of the vehicle, a steering wheel angle interval of the vehicle, and an included-angle interval between the vehicle and a horizontal plane.

With reference to the second aspect, in some implementations of the second aspect, the real-time status parameter includes a vehicle speed of the vehicle; and the control unit is configured to: when the vehicle speed of the vehicle is a first vehicle speed, control the angle of view of the camera of the vehicle to be a fourth angle of view; or when the vehicle speed of the vehicle is a second vehicle speed, control the angle of view of the camera of the vehicle to be a fifth angle of view, where the first vehicle speed is lower than the second vehicle speed, and the fourth angle of view is less than or equal to the fifth angle of view.

In this embodiment of the present disclosure, the apparatus controls the real-time angle of view of the camera based on a vehicle driving speed value obtained in the vehicle driving process and the preset status parameter interval. In this manner, road information with higher accuracy is provided for driving of the driver or the autonomous driving function of the vehicle in a vehicle acceleration or deceleration process, so as to help the driver or the autonomous driving function of the vehicle better adjust a driving policy, thereby improving driving safety.

With reference to the second aspect, in some implementations of the second aspect, the real-time status parameter includes an included angle between the vehicle and the horizontal plane; and the control unit is configured to: when the included angle is a first included angle, control the angle of view of the camera of the vehicle to be a sixth angle of view; or when the included angle is a second included angle, control the angle of view of the camera of the vehicle to be a seventh angle of view, where the first included angle is less than the second included angle, and the sixth angle of view is higher than or equal to the seventh angle of view.

In this embodiment of the present disclosure, the apparatus controls the real-time angle of view of the camera based on the included angle that is between the vehicle and the horizontal plane and that is obtained in the vehicle driving process and the preset status parameter interval. In this manner, in a process in which the vehicle runs uphill or downhill, an angle of view that is of a conventional vehicle-mounted camera and that is fixed relative to a vehicle is changed, so as to help the driver or the autonomous driving function of the vehicle better observe an uphill road condition or a downhill road condition, thereby improving driving safety.

With reference to the second aspect, in some implementations of the second aspect, the real-time status parameter includes a steering wheel angle of the vehicle; and the control unit is configured to: if the steering angle is a counterclockwise-direction steering angle, control the angle of view of the camera of the vehicle to deflect leftward by an angle corresponding to the steering angle; or if the steering angle is a clockwise-direction steering angle, control the angle of view of the camera of the vehicle to deflect rightward by an angle corresponding to the steering angle, where a larger absolute value of the steering angle indicates a larger deflection angle.

In this embodiment of the present disclosure, the real-time angle of view of the camera is controlled based on the steering wheel angle of the vehicle obtained in the vehicle driving process and the preset status parameter interval. In this manner, a fixed angle and range of an angle of view of a camera in a vehicle steering process are changed, so as to help the driver or the autonomous driving function of the vehicle better observe a surrounding environment of the vehicle in a steering process to adjust a vehicle steering policy, thereby improving driving safety.

With reference to the second aspect, in some implementations of the second aspect, the camera is a front-view camera or rear-view camera of the vehicle.

According to a third aspect, an apparatus for controlling an angle of view of a vehicle-mounted camera is provided. The apparatus includes at least one processor and a memory. The at least one processor is coupled to the memory, and is configured to read and execute instructions in the memory. The apparatus is configured to perform the method in the foregoing aspects.

According to a fourth aspect, a computer-readable medium is provided. The computer-readable medium stores program code. When the computer program code is run on a computer, the computer is enabled to perform the method in the foregoing aspects.

According to a fifth aspect, a chip is provided. The chip includes at least one processor and a memory. The at least one processor is coupled to the memory, and is configured to read and execute instructions in the memory. The apparatus is configured to perform the method in the foregoing aspects.

DESCRIPTION OF EMBODIMENTS

The following describes technical solutions in the present disclosure with reference to accompanying drawings.

To facilitate understanding, an example scenario to which embodiments of the present disclosure are applicable is described below with reference to FIG. 1 by using an intelligent driving scenario as an example.

Figure 1:
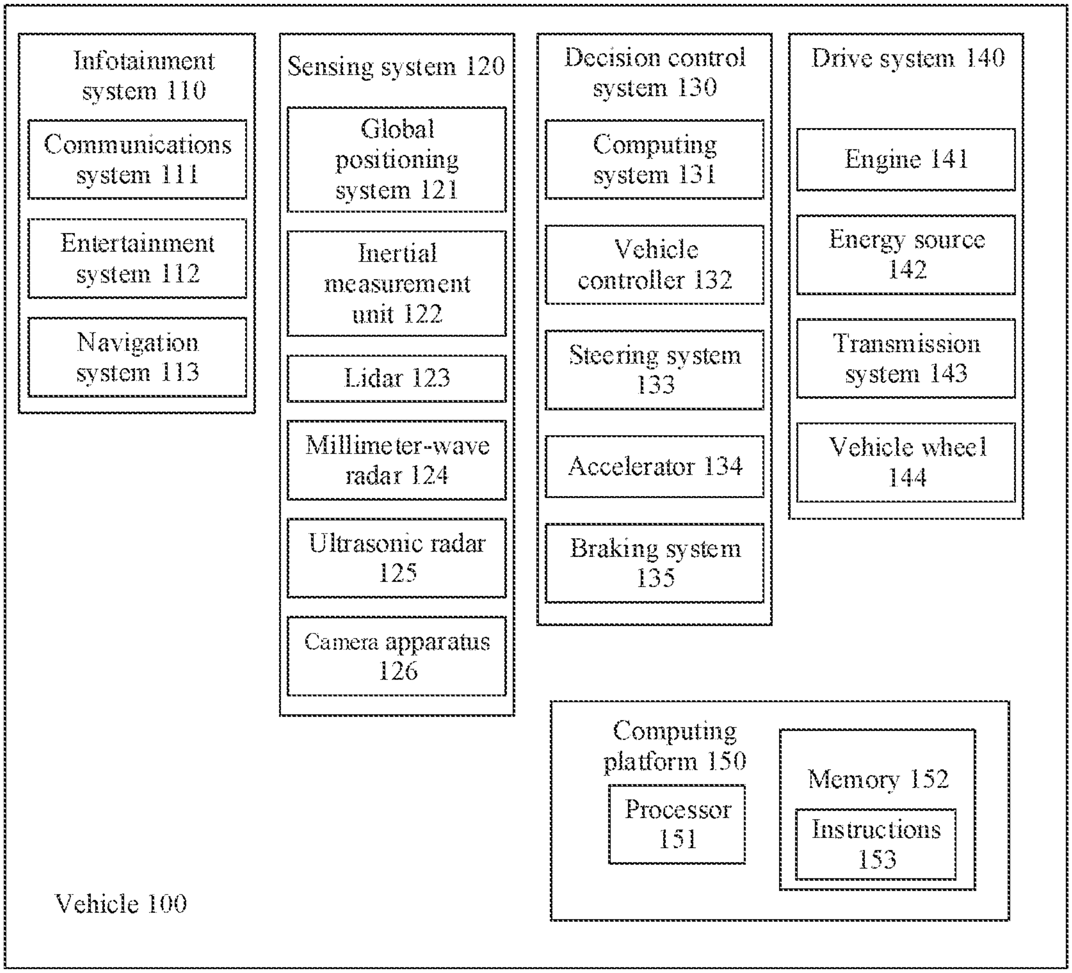
FIG. 1 is a schematic functional diagram of a vehicle according to an embodiment of the present disclosure.

FIG. 1 is a schematic functional diagram of a vehicle 100 according to an embodiment of the present disclosure. The vehicle 100 may be configured to be in a full or partial autonomous driving mode. For example, the vehicle 100 may obtain surrounding environment information by using a sensing system 120, and obtain an autonomous driving policy based on an analysis of the surrounding environment information to implement full autonomous driving, or present an analysis result to a user to implement partial autonomous driving.

The vehicle 100 may include various subsystems, for example, an infotainment system 110, the sensing system 120, a decision control system 130, a drive system 140, and a computing platform 150. In some embodiments, the vehicle 100 may include more or fewer subsystems, and each subsystem may include a plurality of components. In addition, all subsystems and components of the vehicle 100 may be connected to each other in a wired or wireless manner.

In some embodiments, the infotainment system 110 may include a communications system 111, an entertainment system 112, and a navigation system 113.

The communications system 111 may include a wireless communications system, and the wireless communications system may wirelessly communicate with one or more devices directly or by using a communications network. For example, the wireless communications system may perform communication in a third-generation (3G) cellular manner, for example, code-division multiple access (CDMA), Evolution-Data Optimized (EVDO), or Global System for Mobile Communications (GSM)/General Packet Radio Service (GPRS), or perform communication in a fourth-generation (4G) cellular manner, for example, Long-Term Evolution (LTE), or perform communication in a fifth-generation (5G) cellular manner. The wireless communications system may communicate with a wireless local area network (WLAN) by using Wi-Fi. In some embodiments, the wireless communications system may directly communicate with a device by using an infrared link, Bluetooth, or ZigBee. For other wireless protocols, for example, various vehicle communications systems, for example, the wireless communications system may include one or more dedicated short-range communications (DSRC) devices, and these devices may be used for public and/or private data communication between vehicles and/or roadside stations.

The entertainment system 112 may include a central control screen, a microphone, and acoustic equipment. A user may listen to a broadcast and play music in a vehicle based on the entertainment system, or connect a mobile phone to the vehicle and implement screen projection of the mobile phone on the central control screen. The central control screen may be a touchscreen, and the user may perform an operation by touching the screen. In some cases, a voice signal of the user may be obtained by using the microphone, and some control performed by the user on the vehicle 100, for example, adjustment of a temperature in the vehicle, is implemented based on an analysis of the voice signal of the user. In some other cases, music may be played to the user by using the acoustic equipment.

The navigation system 113 may include a map service provided by a map provider, so as to provide driving route navigation for the vehicle 100. The navigation system 113 may be used in combination with a Global Positioning System (GPS) 121 and an inertial measurement unit 122 of the vehicle. The map service provided by the map provider may be a two-dimensional map, or may be a high-precision map.

The sensing system 120 may include several types of sensors for sensing and detecting information about a surrounding environment of the vehicle 100. For example, the sensing system 120 may include the GPS 121 (the GPS 121 may be a GPS system, a BeiDou system, or another positioning system), the inertial measurement unit (IMU) 122, a lidar 123, a millimeter-wave radar 124, an ultrasonic radar 125, and a camera apparatus 126. The sensing system 120 may further include sensors (for example, an in-vehicle air quality monitor, a fuel gauge, and an oil temperature gauge) of an internal system of the monitored vehicle 100. Sensor data from one or more of these sensors may be used to detect an object and corresponding characteristics (a position, a shape, a direction, a speed, and the like) of the object. Such detection and identification are critical functions for safe operation of the vehicle 100.

The global positioning system 121 may be configured to estimate a geographical position of the vehicle 100.

The inertial measurement unit 122 is configured to sense changes of a position and an orientation of the vehicle 100 based on an inertial acceleration. In some embodiments, the inertial measurement unit 122 may be a combination of an accelerometer and a gyroscope.

The lidar 123 may use laser light to sense an object in an environment in which the vehicle 100 is located. In some embodiments, the lidar 123 may include one or more laser sources, a laser scanner, one or more detectors, and another system component.

The millimeter-wave radar 124 may sense an object in the surrounding environment of the vehicle 100 by using a radio signal. In some embodiments, in addition to sensing an object, the radar 126 may be further configured to sense a speed and/or a moving direction of the object.

The ultrasonic radar 125 may sense an object around the vehicle 100 by using an ultrasonic signal.

The camera apparatus 126 may be configured to capture image information of the surrounding environment of the vehicle 100. The camera apparatus 126 may include a monocular camera, a binocular camera, a structured light camera, a panoramic camera, and the like. The image information obtained by the camera apparatus 126 may include a static image, or may include video stream information.

The decision control system 130 includes a computing system 131 that performs analysis and decision making based on information obtained by the sensing system 120. The decision control system 130 further includes a vehicle controller 132 that controls a power system of the vehicle 100, and a steering system 133, an accelerator 134, and a braking system 135 that are configured to control the vehicle 100.

The computing system 131 may be operated to process and analyze various information obtained by the sensing system 120, so as to identify a target, an object, and/or a feature in the surrounding environment of the vehicle 100. The target may include a pedestrian or an animal. The object and/or the feature may include a traffic signal, a road boundary, and an obstacle. The computing system 131 may use technologies such as an object recognition algorithm, a structure from motion (SFM) algorithm, and video tracking. In some embodiments, the computing system 131 may be configured to map an environment, track an object, estimate a speed of an object, and the like. The computing system 131 may analyze various obtained information, and obtain a control policy for the vehicle.

The vehicle controller 132 may be configured to perform coordinate control on a power battery and an engine 141 of the vehicle, to improve power performance of the vehicle 100.

The steering system 133 may be operated to adjust a running direction of the vehicle 100. For example, in an embodiment, the steering system may be a steering wheel system.

The accelerator 134 is configured to control an operation speed of the engine 141 and thereby control a speed of the vehicle 100.

The braking system 135 is configured to control the vehicle 100 to decelerate. The braking system 135 may slow down a vehicle wheel 144 by using a friction force. In some embodiments, the braking system 135 may convert kinetic energy of the vehicle wheel 144 into a current. Alternatively, the braking system 135 may reduce a rotation speed of the vehicle wheel 144 in another manner, to control a speed of the vehicle 100.

The drive system 140 may include a component that provides motion power for the vehicle 100. In an embodiment, the drive system 140 may include the engine 141, an energy source 142, a transmission system 143, and the vehicle wheel 144. The engine 141 may be an internal combustion engine, a motor, a compressed air engine, or another type of engine combination, for example, a hybrid engine that includes a gasoline engine and a motor, or a hybrid engine that includes an internal combustion engine and a compressed air engine. The engine 141 converts the energy source 142 into mechanical energy.

Examples of the energy source 142 include gasoline, diesel, another petroleum-based fuel, propane, another fuel based on compressed gas, ethanol, a solar panel, a battery, and another electric power source. The energy source 142 may also provide energy for another system of the vehicle 100.

The transmission apparatus 143 may transmit mechanical power from the engine 141 to the vehicle wheel 144. The transmission apparatus 143 may include a gearbox, a differential, and a drive shaft. In an embodiment, the transmission apparatus 143 may further include another component, for example, a clutch. The drive shaft may include one or more shafts that can be coupled to one or more vehicle wheels 121.

Some or all of functions of the vehicle 100 are controlled by the computing platform 150. The computing platform 150 may include at least one processor 151. The processor 151 may execute instructions 153 stored in a non-transitory computer-readable medium such as a memory 152. In some embodiments, alternatively, the computing platform 150 may be a plurality of computing devices that control individual components or subsystems of the vehicle 100 in a distributed manner.

The processor 151 may be any conventional processor, for example, a commercially available central processing unit (CPU). Alternatively, the processor 151 may include, for example, a graphics processing unit (GPU), a field-programmable gate array (FPGA), a system on chip (SOC), an application-specific integrated circuit (ASIC), or a combination thereof. Although FIG. 1 functionally shows the processor, the memory, and other elements of a computer 110 in a same block, a person of ordinary skill in the art should understand that the processor, the computer, or the memory may actually include a plurality of processors, computers, or memories that may be or may not be accommodated in a same physical housing. For example, the memory may be a hard disk drive, or another storage medium located in a housing different from that of the computer 110. Therefore, reference to the processor or the computer is understood as including reference to a set of processors or computers or memories that may or may not operate in parallel. Different from a case in which steps described herein are performed by using a single processor, each of some components such as a steering component and a deceleration component may have a processor of its own, and the processor performs only computation related to a component-specific function.

In various aspects described herein, the processor may be located far away from the vehicle, and wirelessly communicate with the vehicle. In another aspect, some of processes described herein are performed by the processor disposed in the vehicle, and the rest of the processes are performed by a remote processor, including steps necessary for single manipulation.

In some embodiments, the memory 152 may include the instructions 153 (for example, program logic), and the instructions 153 may be executed by the processor 151 to perform various functions of the vehicle 100. The memory 152 may also include additional instructions, including instructions for sending data to, receiving data from, interacting with, and/or controlling one or more of the infotainment system 110, the sensing system 120, the decision control system 130, and the drive system 140.

In addition to the instructions 153, the memory 152 may further store data, for example, a road map, route information, a position, direction, and speed of the vehicle, other such vehicle data, and other information. Such information may be used by the vehicle 100 and the computing platform 150 during autonomous-mode, semi-autonomous-mode, and/or manual-mode operation of the vehicle 100.

The computing platform 150 may control functions of the vehicle 100 based on inputs received from various subsystems (for example, the drive system 140, the sensing system 120, and the decision control system 130). For example, the computing platform 150 may use an input from the decision control system 130 to control the steering system 133 to avoid an obstacle detected by the sensing system 120. In some embodiments, the computing platform 150 may be operated to provide control for many aspects of the vehicle 100 and the subsystems of vehicle.

In some embodiments, one or more of the foregoing components may be installed separately from or associated with the vehicle 100. For example, the memory 152 may be partially or completely separate from the vehicle 100. The foregoing components may be communicatively coupled to each other in a wired manner and/or a wireless manner.

In some embodiments, the foregoing components are merely an example. In actual application, components in the foregoing modules may be added or removed based on an actual requirement. FIG. 1 shall not be construed as a limitation on the embodiments of the present disclosure.

An autonomous driving vehicle such as the vehicle 100 running on a road may identify an object in a surrounding environment of the vehicle to determine adjustment of a current speed. The object may be another vehicle, a traffic control device, or another type of object. In some examples, each identified object may be independently considered, and a value by which a speed of the autonomous driving vehicle is to be adjusted may be determined based on a characteristic of each object, such as a current speed of the object, an acceleration of the object, and a distance between the object and the vehicle.

In some embodiments, the vehicle 100 or sensing and computing devices (for example, the computing system 131 and the computing platform 150) associated with the vehicle 100 may predict a behavior of the identified object based on a characteristic of the identified object and a status (for example, traffic, rain, or ice on the road) of the surrounding environment. In some embodiments, all identified objects are dependent on a behavior of each other, and therefore, all the identified objects may be considered together, to predict a behavior of a single identified object. The vehicle 100 can adjust the speed of the vehicle 100 based on the predicted behavior of the identified object. In other words, the autonomous driving vehicle can determine, based on the predicted behavior of the object, a stable state to which the vehicle needs to be adjusted (for example, acceleration, deceleration, or stopping). In this process, another factor such as a transverse-direction position of the vehicle 100 on the road on which the vehicle runs, curvature of the road, or a degree of proximity between static and dynamic objects may also be considered, to determine the speed of the vehicle 100.

In addition to providing an instruction for adjusting the speed of the autonomous driving vehicle, the computing device may further provide an instruction for changing a steering angle of the vehicle 100, so that the autonomous driving vehicle follows a given trajectory and/or maintains safe transverse and longitudinal distances from an object (for example, a car in an adjacent lane on the road) near the autonomous driving vehicle.

The vehicle 100 may be a car, a truck, a motorcycle, a bus, a boat, an airplane, a helicopter, a lawn mower, a recreational vehicle, an amusement-park vehicle, a construction device, a trolley, a golf cart, a train, or the like. This is not limited in this embodiment of the present disclosure.

Figure 2:
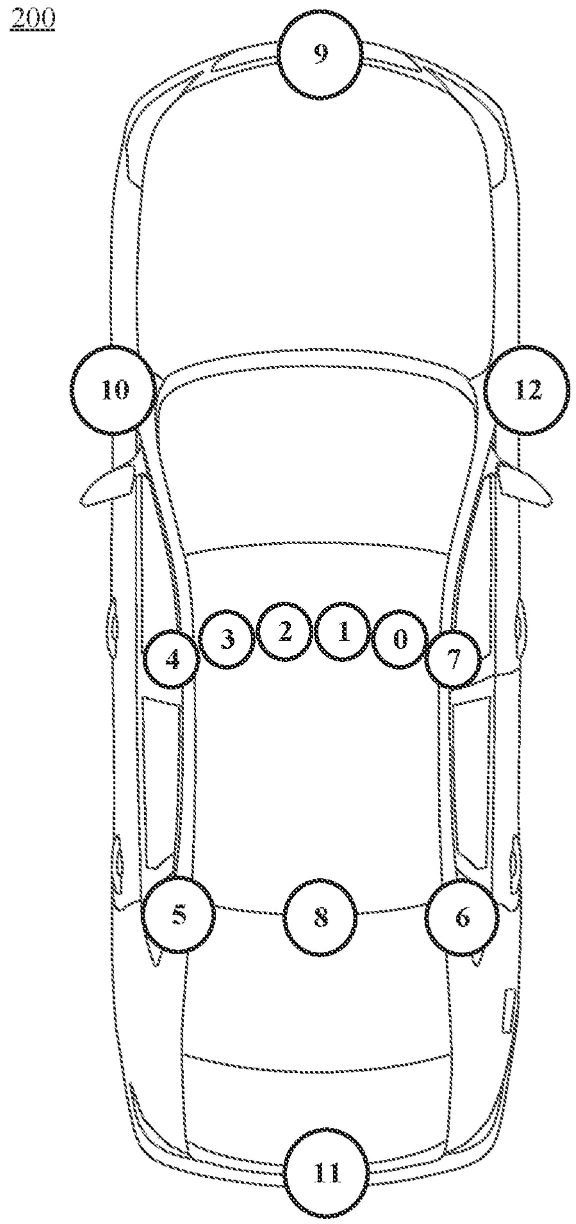
FIG. 2 is a schematic diagram of a vehicle camera system according to an embodiment of the present disclosure.

FIG. 2 is a schematic diagram of a vehicle camera system according to an embodiment of the present disclosure. A motor vehicle 200 in the figure is a specific example of the vehicle 100 in FIG. 1.

The motor vehicle 200 may have a camera system, and the camera system may have one or more cameras 0-12. In the shown example, a camera 9 may be a front-view camera, a camera 11 may be a rear-view camera, each of cameras 10 and 12 may be a side-view camera, and cameras 0-8 may be distributed on the top of the vehicle.

In some embodiments, a camera applicable to this embodiment may be a fisheye camera whose angle of view reaches 220° or 230°. A specific specification of the camera is not limited in this embodiment of the present disclosure.

It should be understood that a quantity of cameras on the vehicle and a type of the camera are not limited in this embodiment. A camera distribution status in the vehicle camera system in FIG. 2 is merely an example for description. Any case in which the camera deployed on the vehicle can make a corresponding change based on a real-time angle of view in a vehicle driving process may be applied to this embodiment of the present disclosure.

An angle of view of the camera may be changed in a manner such as adjusting a focus of the camera, rotating the camera, or moving the camera. For example, if the angle of view of the camera needs to be increased, that is, a range of an image shot by the camera needs to be made larger, a focal length of the camera may be increased; otherwise, if the angle of view of the camera needs to be decreased, that is, a range of an image shot by the camera needs to be made smaller, a focal length of the camera may be decreased. For another example, if the angle of view of the camera needs to be adjusted in an upper/lower direction or a left/right direction (that is, an angle-of-view range of the camera is not changed, but a median line of the angle of view is rotated), the angle of view may be rotated or translated by rotating and/or translating the camera (for example, rotating or translating the camera by using a mechanical mechanism).

To facilitate understanding of the embodiments of the present disclosure, the following describes terms used in the embodiments of the present disclosure.

(1) Fisheye camera: A fisheye camera is a lens with an extremely short focal length and an angle of view. A visual effect of a fisheye camera is similar to that of a fish eye observing a scene that is on a water surface. A fish eye is similar to a human eye in structure, and is a relatively oblate crystal. Although a fish eye can see only comparatively close objects, an angle-of-view range of a fish eye is comparatively large.

(2) Angle of view of a camera: An angle of view of a camera is an angle that a camera lens can reach, shoot, and see. An angle of view of a camera is a range value.

(3) Switching: If one device has a plurality of cameras (for example, a front-facing camera and a rear-facing camera), a camera may be invoked through switching.

(4) Zoom ratio: A zoom ratio is usually a ratio of a maximum focal length of a zoom lens to a minimum focal length of the zoom lens. Zoom can better ensure that image quality is not obviously reduced due to focal length adjustment. A larger zoom ratio indicates a longer distance from a scene that can be shot.

(5) Slope inclination angle: A slope inclination angle is an included angle between a slope and a horizontal plane of the ground in a vehicle driving process. A slope inclination angle value may also be referred to as a vehicle body inclination angle value.

If an angle of view of a vehicle-mounted camera remains unchanged relative to a vehicle, an angle and a range of a shot image also remain unchanged relative to the vehicle. As a vehicle driving status changes, such a fixed angle of view results in a blind area, which affects vehicle safety. For example, when a vehicle turns, if an angle of view of a vehicle-mounted camera remains unchanged, a driver or an autonomous driving function easily encounters a blind area during turning, and consequently cannot observe an obstacle in a side direction in a vehicle turning process. As a result, an accident easily occurs. For another example, when a vehicle accelerates, if an angle of view of a vehicle-mounted camera remains unchanged, a driver is prone to eye strain, and moreover, it is not easy for the driver or an autonomous driving apparatus to focus on a road condition in front of the vehicle. As a result, a coping policy cannot be quickly adjusted when danger comes, and a traffic accident easily occurs. For another example, in a process in which a vehicle runs uphill, if an angle of view of a vehicle-mounted camera remains unchanged, a driver or an autonomous driving apparatus cannot effectively observe a road condition on a slope, and an accident easily occurs.

Figure 3:
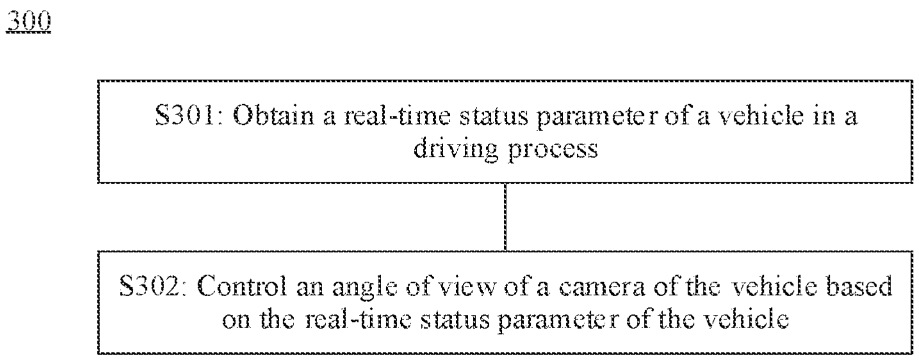
FIG. 3 is a schematic diagram of a method 300 for controlling an angle of view of a vehicle-mounted camera according to an embodiment of the present disclosure.

FIG. 3 is a schematic diagram of a method 300 for controlling an angle of view of a vehicle-mounted camera according to an embodiment of the present disclosure. The method 300 may be applied to the vehicle 100 in FIG. 1 or the vehicle 200 in FIG. 2. In a driving process, the angle of view of the camera of the vehicle may change with a driving condition of the vehicle. The method 300 may include the following steps.

S301: Obtain a real-time status parameter of the vehicle in the driving process.

The real-time status parameter is used to indicate a real-time driving status of the vehicle. For example, the real-time status parameter may be used to represent a real-time speed (for example, a driving speed value) of the vehicle, a real-time turning status of the vehicle (for example, a steering wheel angle of the vehicle), or a real-time inclination status of the vehicle (an included angle between the vehicle and a horizontal plane).

It should be understood that the foregoing examples of the real-time status parameter in the vehicle driving process are merely examples for description. This is not limited in this embodiment. Alternatively, the parameter may be another type of real-time status parameter that may be obtained in the vehicle driving process.

S302: Control the angle of view of the camera of the vehicle based on the real-time status parameter.

Based on the foregoing technical solution, according to this embodiment of the present disclosure, in the vehicle driving process, the status parameter can be obtained in real time, and the angle of view of the camera can be controlled in real time. Compared with a case in which an angle of view of a camera remains unchanged relative to a vehicle in a driving process, this can improve driving safety.

In the angle-of-view control method in this embodiment of the present disclosure, various suitable real-time control solutions may be used.

For example, a correspondence between a specific value range of a real-time status parameter of the vehicle and an angle of view may be set, to search for a corresponding angle of view based on a status parameter value collected in real time, thereby dynamically controlling the angle of view of the vehicle-mounted camera.

Table 1 provides an example of a correspondence between a value range of a real-time status parameter and an angle of view.

TABLE 1

| Value range | Angle of view |
|---|---|
| Range 1 | Angle of view 1 |
| Range 2 | Angle of view 2 |
| Range 3 | Angle of view 3 |

According to an implementation in Table 1, a value range to which a real-time status parameter belongs may be first determined, then a corresponding angle of view is determined, and the vehicle-mounted camera is controlled based on the determined angle of view, so that the angle of view of the vehicle-mounted camera changes in real time.

In this way, real-time dynamic control of the angle of view of the vehicle-mounted camera can be conveniently implemented, thereby improving driving safety.

In another implementation, the angle of view of the vehicle-mounted camera may be determined based on a numerical relation between the real-time status parameter and the angle of view. For example, the real-time status parameter and the angle of view may be in a linear relationship, which is as follows:

$$y = a^{*}x + b$$

Herein, x is a value of the real-time status parameter, y is the angle of view, and a and b are preset real numbers.

Certainly, the numerical relation between the real-time status parameter and the angle of view is not limited to the foregoing linear form, but may be alternatively in a non-linear form.

In this way, real-time dynamic control of the angle of view of the vehicle-mounted camera can be conveniently implemented, thereby improving driving safety.

In still another implementation, the angle of view of the camera of the vehicle may be controlled based on the real-time status parameter and a preset status parameter interval.

In some embodiments, outside the status parameter interval, the angle of view of the camera may be controlled to be a fixed value; within the status parameter interval, the angle of view of the camera may be controlled to change based on a specific value of the real-time status parameter, for example, change based on a linear or non-linear relationship, or change in a manner similar to that in Table 1.

In this way, real-time dynamic control of the angle of view of the vehicle-mounted camera can be conveniently implemented, thereby improving driving safety. In addition, upper and lower limit values of the angle of view can be controlled, which is more suitable for a scenario in which an angle-of-view change range is limited.

In some embodiments, the status parameter interval may be configured by a user or another management device. In this case, configuration information of the status parameter interval may be received in advance, for example, the configuration information is received from the user or the another management device; and the status parameter interval is configured based on the configuration information.

In this way, the status parameter interval can be dynamically adjusted, thereby adapting to requirements in different scenarios more flexibly.

In some embodiments, the status parameter interval may include at least one of the following intervals: a speed interval of the vehicle, a steering wheel angle interval of the vehicle, and an included-angle interval between the vehicle and the horizontal plane.

The following describes the embodiments of the present disclosure in detail with reference to processes shown in FIG. 4 to FIG. 19.

Figure 4:
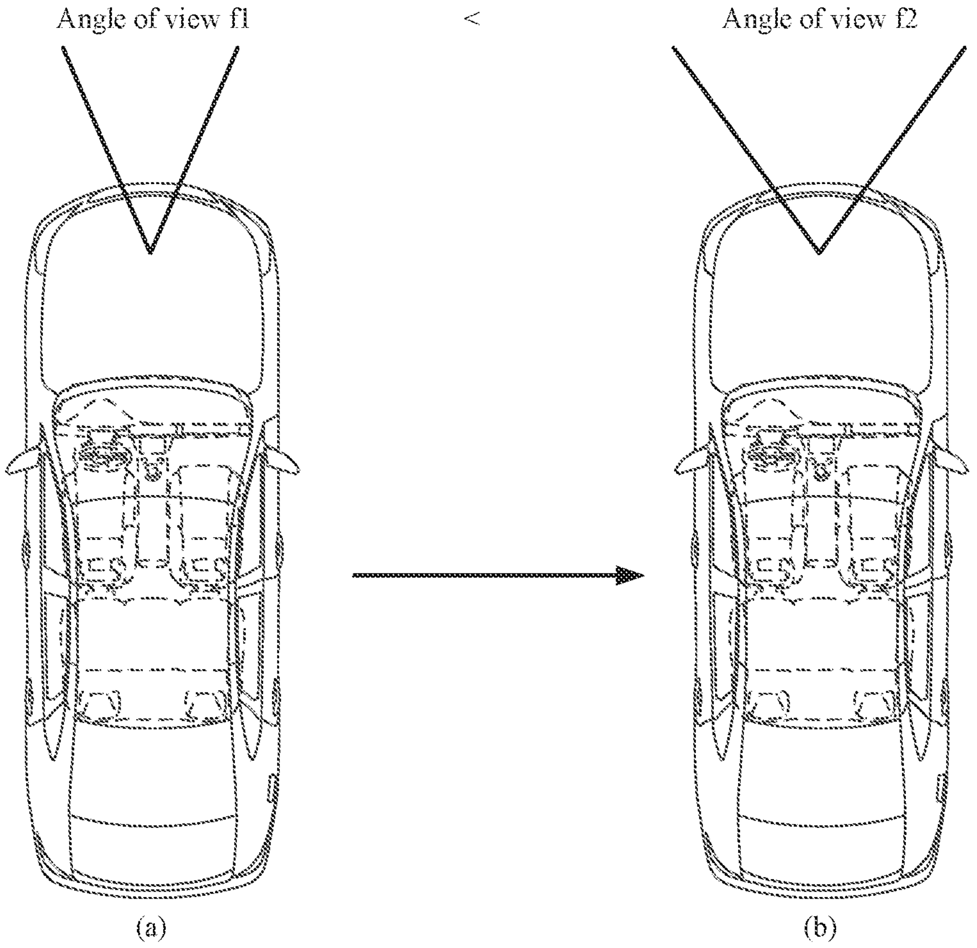
FIG. 4 is a schematic diagram of an angle-of-view change of a front-view camera in a vehicle acceleration process according to an embodiment of the present disclosure.

FIG. 4 is a schematic diagram of an angle-of-view change of a front-view camera in a vehicle acceleration process according to an embodiment of the present disclosure. FIG. 4 is a possible implementation of step S302 in FIG. 3.

In this manner, the real-time status parameter includes a vehicle speed of the vehicle; and the controlling the angle of view of the camera of the vehicle based on the real-time status parameter includes: when the vehicle speed of the vehicle is a first vehicle speed, controlling the angle of view of the camera of the vehicle to be f1; or when the vehicle speed of the vehicle is a second vehicle speed, controlling the angle of view of the camera of the vehicle to be f2, where the first vehicle speed is lower than the second vehicle speed, and the angle of view f1 is less than or equal to the angle of view f2.

As an example for description, in the embodiments of the present disclosure, "an angle of view is less than or equal to another angle of view" may mean a magnitude relationship between angle-of-view values, and a smaller angle of view corresponds to a smaller angle-of-view value.

This embodiment is described below:

As shown in (a) in FIG. 4, in a normal driving condition, when the angle of view of the camera is switched to front view, an angle of view of the front-view camera is f1.

As shown in (b) in FIG. 4, during vehicle acceleration, the angle of view of the front-view camera is controlled to increase from the smaller f1 to f2.

In this manner, when a vehicle driving speed is higher, the angle of view of the front-view camera of the vehicle is controlled to increase, so that safer visual information of a condition in front of the vehicle can be provided.

Figure 5:
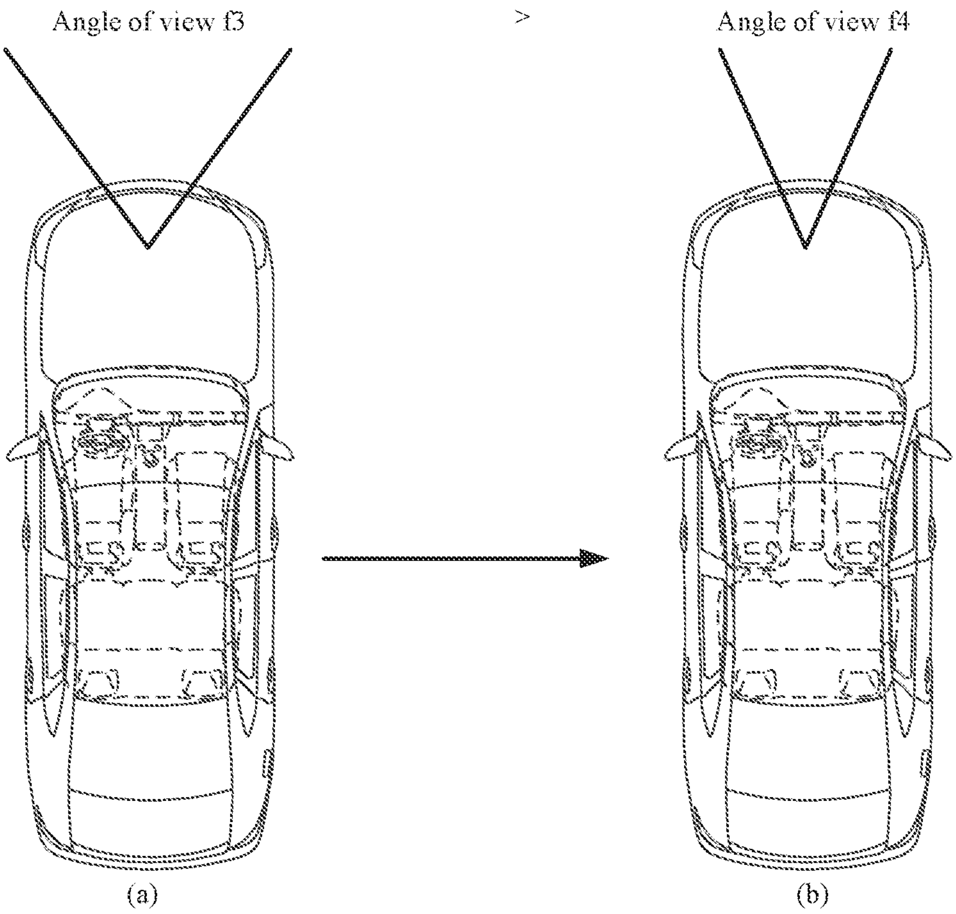
FIG. 5 is a schematic diagram of an angle-of-view change of a front-view camera in a vehicle deceleration process according to an embodiment of the present disclosure.

FIG. 5 is a schematic diagram of an angle-of-view change of a front-view camera in a vehicle deceleration process according to an embodiment of the present disclosure. FIG. 5 is a possible implementation of step S302 in FIG. 3.

In this manner, the real-time status parameter includes a vehicle speed of the vehicle; and the controlling the angle of view of the camera of the vehicle based on the real-time status parameter includes: when the vehicle speed of the vehicle is a first vehicle speed, controlling the angle of view of the camera of the vehicle to be f3; or when the vehicle speed of the vehicle is a second vehicle speed, controlling the angle of view of the camera of the vehicle to be f4, where the first vehicle speed is higher than the second vehicle speed, and the angle of view f3 is greater than or equal to the angle of view f4.

As shown in (a) in FIG. 5, in a normal driving condition, when the angle of view of the camera is switched to front view, an angle of view of the front-view camera is f3.

As shown in (b) in FIG. 5, during vehicle deceleration, the angle of view of the front-view camera is controlled to decrease from the larger f3 to f4.

In this manner, when a vehicle driving speed is lower, the angle of view of the front-view camera of the vehicle is controlled to decrease, so that safer visual information of a condition in front of the vehicle can be provided.

Figure 6:
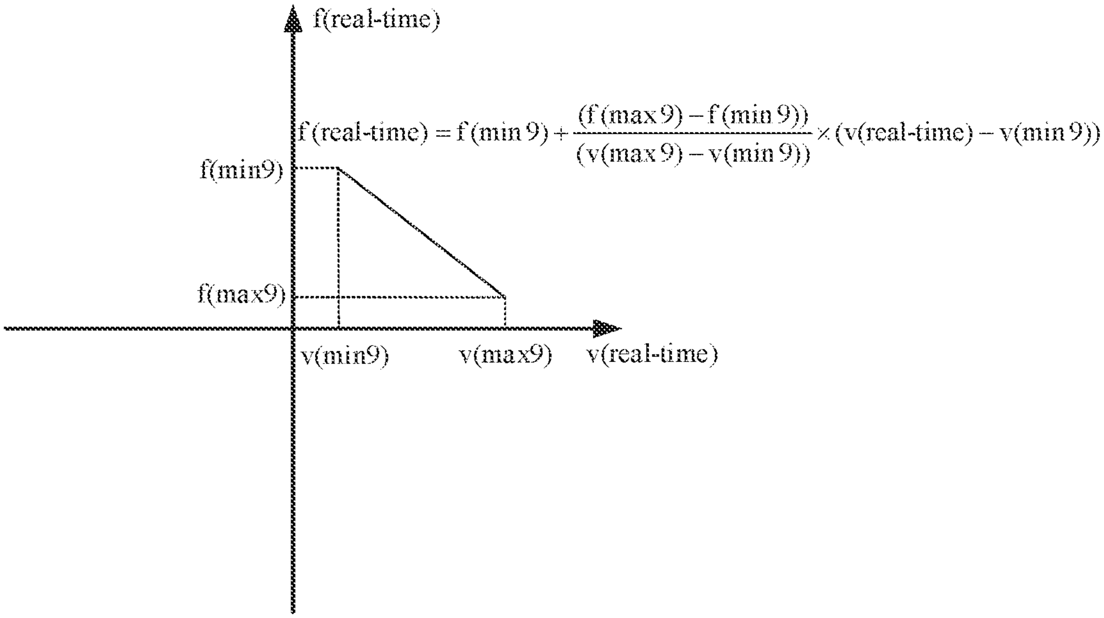
FIG. 6 is a function relationship diagram of an angle of view of a front-view camera of a vehicle changing with a speed according to an embodiment of the present disclosure.

FIG. 6 is a function relationship diagram of an angle of view of a front-view camera of a vehicle changing with a speed according to an embodiment of the present disclosure. FIG. 6 is a specific manner of controlling the angle of view of the front-view camera to change in FIG. 4 or FIG. 5.

As shown in FIG. 6, when the angle of view of the camera is switched to front view, linear transformation exists between the driving speed and the angle of view of the front-view camera in the preset status parameter interval, so as to implement change transition of the angle of view. A specific process of the change transition includes the following:

An angle-of-view range that is related to a speed change and that is of the front-view camera 9 is from f(min9) to f(max9), and a corresponding speed range in which an angle-of-view change occurs is from v(min9) to v(max9).

When the real-time vehicle speed v meets a condition v(min9)≤v(real-time)≤v(max9), the following is satisfied:

$$f(\text{real-time}) = f(\text{min9}) + \frac{(f(\text{max9}) - f(\text{min9}))}{(v(\text{max9}) - v(\text{min9}))} \times (v(\text{real-time}) - v(\text{min9}))$$

When the real-time vehicle speed v(real-time) meets the following condition, f(real-time) is as follows:

When v(real-time) is greater than v(max9), f(real-time) is equal to f(max9).

When v(real-time) is less than v(min9), f(real-time) is equal to f(min9).

For example, if an angle-of-view range in which the angle of view of the front-view camera changes with the speed is from 30° to 120°, a corresponding speed range in which an angle-of-view change occurs is from 20 km/h to 110 km/h.

When the real-time vehicle speed v meets a condition 20≤v(real-time)≤110, if v(real-time) is equal to 90 km/h, f(real-time) is as follows: f(real-time)=30+(120−30)/(110−20)×(90−20)=100°.

In a possible case, when the vehicle travels in a tough driving condition, for example, a condition such as night, rain, snow, or haze, an angle-of-view change range is increased by a coefficient multiple n, where 1<n≤1.5.

In this case, the angle-of-view change range of the front-view camera is as follows: F(min9)–f(min9)×n, and F(max9)=f(max9)×n.

The angle-of-view range that is related to a speed change and that is of the front-view camera is from F(min9) to F(max9).

For example, when the vehicle travels in a tough driving condition, for example, a condition such as night, rain, snow, or haze, the angle-of-view change range is increased by a coefficient multiple 1.2. If an angle-of-view range in which the angle of view of the front-view camera changes with the speed is from 42° to 144°, a corresponding speed range in which an angle-of-view change occurs is from 20 km/h to 110 km/h.

When the real-time vehicle speed v meets a condition 20≤v(real-time)≤110, if v(real-time) is equal to 90 km/h, f(real-time) is as follows: f(real-time)=42+(144–42)/(110–20)×(90–20)≈121.3°.

Based on this, according to the embodiments of the present disclosure, when the vehicle driving speed value meets the preset status parameter interval, the real-time angle of view of the front-view camera of the vehicle is determined based on the obtained vehicle driving speed value and maximum and minimum values in the preset status parameter interval; or when the vehicle driving speed value does not meet the preset status parameter interval, the real-time angle of view of the front-view camera is set to the maximum value or the minimum value. In the two manners, according to the embodiments of the present disclosure, a fixed angle of view of a front-view camera is changed in a vehicle driving process, so as to help a driver or an autonomous driving function of a vehicle better observe a surrounding driving environment, thereby improving driving safety.

It should be understood that the method for controlling a front-view camera of a vehicle in the embodiments of the present disclosure is merely an example. A manner of controlling an angle of view of a camera based on a vehicle speed may be based on maximum and minimum values in a preset interval, or may not be based on a preset interval; may be based on a linear change of a vehicle speed in a preset interval, or may be based on non-linear transformation; and may be obtained through calculation based on a formula, or may be obtained in another manner. This is not strictly limited in the embodiments of the present disclosure.

Figure 7:
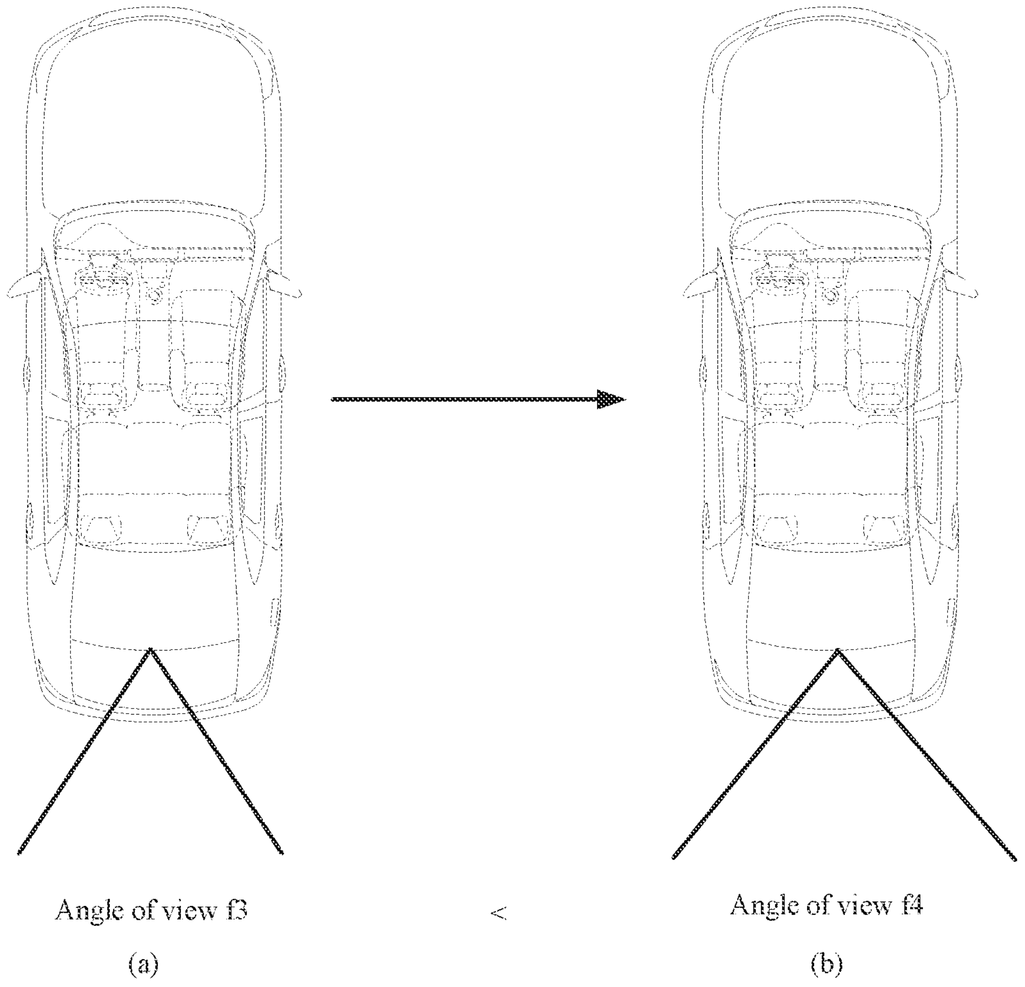
FIG. 7 is a schematic diagram of an angle-of-view change of a rear-view camera in a vehicle acceleration process according to an embodiment of the present disclosure.

FIG. 7 is a schematic diagram of an angle-of-view change of a rear-view camera in a vehicle acceleration process according to an embodiment of the present disclosure. FIG. 7 is a possible implementation of step S302 in FIG. 3.

In this manner, the real-time status parameter includes a vehicle speed of the vehicle; and the controlling the angle of view of the camera of the vehicle based on the real-time status parameter includes: when the vehicle speed of the vehicle is a first vehicle speed, controlling the angle of view of the camera of the vehicle to be an angle of view f3; or when the vehicle speed of the vehicle is a second vehicle speed, controlling the angle of view of the camera of the vehicle to be an angle of view f4, where the first vehicle speed is lower than the second vehicle speed, and the angle of view f3 is less than or equal to the angle of view f4.

This embodiment is described below:

As shown in (a) in FIG. 7, in a normal driving condition, when the angle of view of the camera is switched to rear view, an angle of view of the rear-view camera is f3.

As shown in (b) in FIG. 7, during vehicle acceleration, the angle of view of the rear-view camera is increased from the smaller f3 to f4.

In this manner, when a vehicle driving speed is higher, the angle of view of the rear-view camera of the vehicle is controlled to increase, so that safer visual information of a condition behind the vehicle can be provided.

Figure 8:
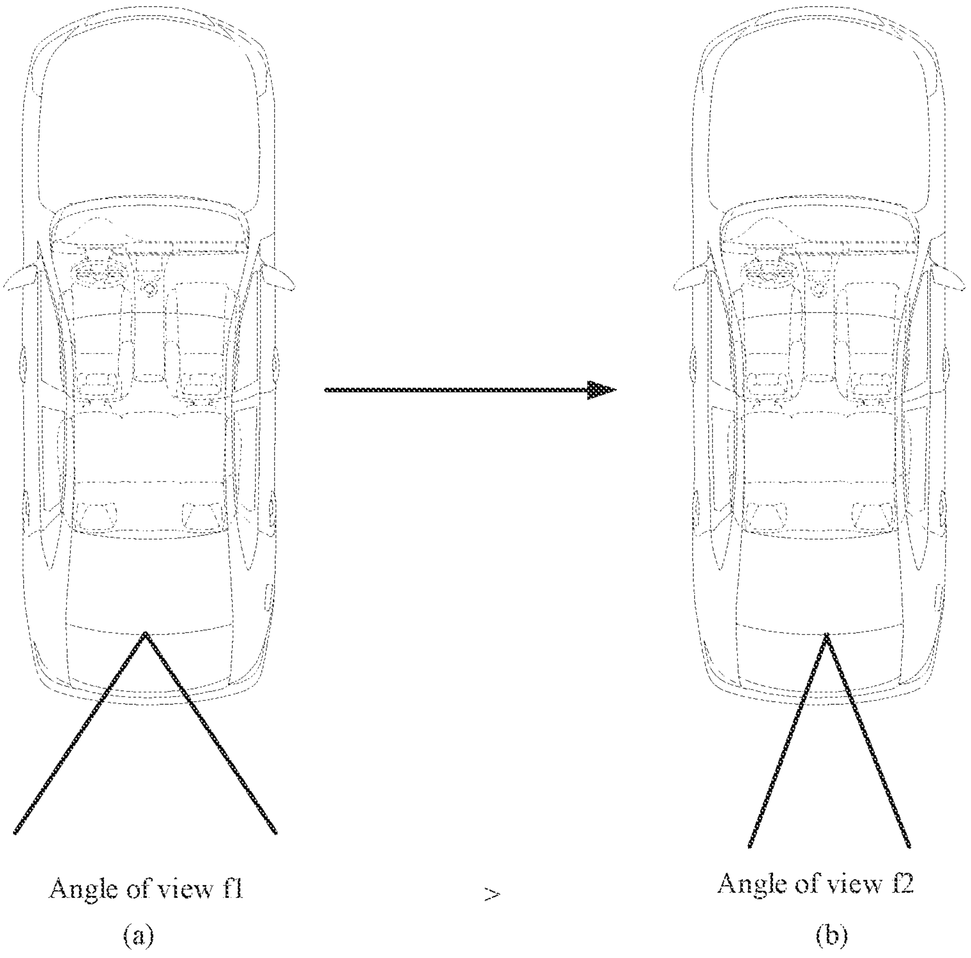
FIG. 8 is a schematic diagram of an angle-of-view change of a rear-view camera in a vehicle deceleration process according to an embodiment of the present disclosure.

FIG. 8 is a schematic diagram of an angle-of-view change of a rear-view camera in a vehicle deceleration process according to an embodiment of the present disclosure. FIG. 8 is a possible implementation of step S302 in FIG. 3.

In this manner, the real-time status parameter includes a vehicle speed of the vehicle; and the controlling the angle of view of the camera of the vehicle based on the real-time status parameter includes: when the vehicle speed of the vehicle is a first vehicle speed, controlling the angle of view of the camera of the vehicle to be an angle of view f1; or when the vehicle speed of the vehicle is a second vehicle speed, controlling the angle of view of the camera of the vehicle to be an angle of view f2, where the first vehicle speed is higher than the second vehicle speed, and the angle of view f1 is greater than or equal to the angle of view f2.

As shown in (a) in FIG. 8, in a normal driving condition, when the angle of view of the camera is switched to rear view, an angle of view of the rear-view camera is f1.

As shown in (b) in FIG. 8, during vehicle deceleration, the angle of view of the rear-view camera is decreased from the larger f1 to f2.

In this manner, when a vehicle driving speed is lower, the angle of view of the rear-view camera of the vehicle is controlled to decrease, so that safer visual information of a condition behind the vehicle can be provided.

Figure 9:
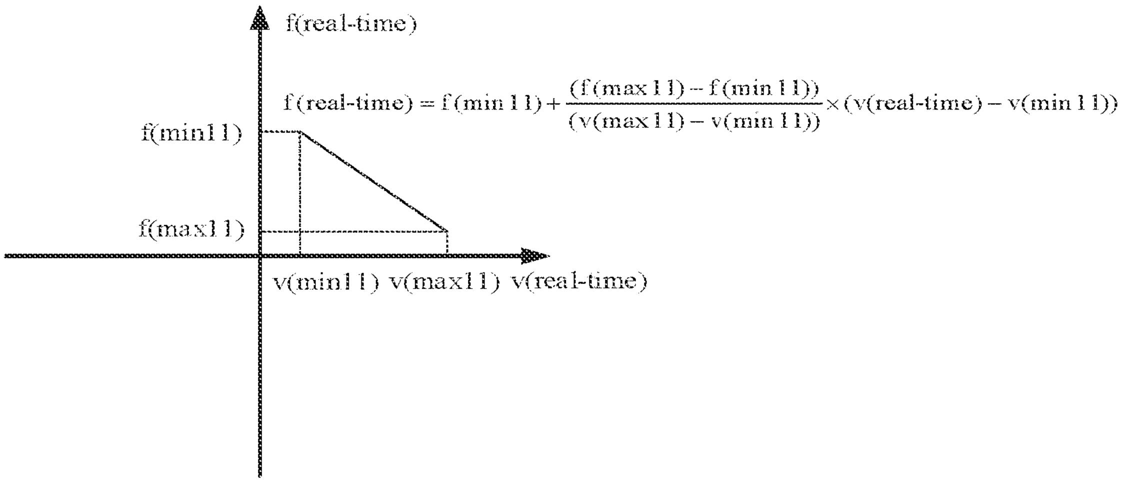
FIG. 9 is a function relationship diagram of an angle of view of a rear-view camera of a vehicle changing with a speed according to an embodiment of the present disclosure.

FIG. 9 is a function relationship diagram of an angle of view of a rear-view camera of a vehicle changing with a speed according to an embodiment of the present disclosure. FIG. 9 is a specific manner of controlling the angle of view of the rear-view camera to change in FIG. 7 or FIG. 8.

As shown in FIG. 9, when the angle of view of the camera is switched to rear view, linear transformation exists between the driving speed and the angle of view of the rear-view camera in the preset status parameter interval, so as to implement change transition of the angle of view. A specific process of the change transition includes the following:

An angle-of-view range that is related to a speed change and that is of the rear-view camera 11 is from f(min11) to f(max11), and a corresponding speed range in which an angle-of-view change occurs is from v(min11) to v(max11).

When the real-time vehicle speed v meets a condition v(min11)<v(real-time)≤v(max11), the following is satisfied:

$$f(\text{real-time}) = f(\text{min11}) + \frac{(f(\text{max11}) - f(\text{min11}))}{(v(\text{max11}) - v(\text{min11}))} \times (v(\text{real-time}) - v(\text{min11}))$$

When the real-time vehicle speed v(real-time) meets the following condition, f(real-time) is as follows:

When v(real-time) is greater than v(max11), f(real-time) is equal to f(max11).

When v(real-time) is less than v(min11), f(real-time) is equal to f(min11).

For example, if an angle-of-view range in which the angle of view of the rear-view camera changes with the speed is from 30° to 120°, a corresponding speed range in which an angle-of-view change occurs is from 20 km/h to 110 km/h.

When the real-time vehicle speed v meets a condition 20≤v(real-time)≤110, if v(real-time) is equal to 90 km/h, f(real-time) is as follows: f(real-time)=30+(120–30)/(110–20)×(90–20)=100°.

In a possible case, when the vehicle travels in a tough driving condition, for example, a condition such as night, rain, snow, or haze, an angle-of-view change range is increased by a coefficient multiple n, where $1<n\leq 1.5$.

In this case, the angle-of-view change range of the rear-view camera is as follows: F(min11)=f(min11)×n, and F(max11)=f(max11)×n.

The angle-of-view range that is related to a speed change and that is of the rear-view camera is from F(min11) to F(max11).

For example, when the vehicle travels in a tough driving condition, for example, a condition such as night, rain, snow, or haze, the angle-of-view change range is increased by a coefficient multiple 1.2. If an angle-of-view range in which the angle of view of the rear-view camera changes with the speed is from 42° to 144°, a corresponding speed range in which an angle-of-view change occurs is from 20 km/h to 110 km/h.

When the real-time vehicle speed v meets a condition 20≤v(real-time)≤110, if v(real-time) is equal to 90 km/h, f(real-time) is as follows: f(real-time)=42+(144−42)/(110−20)×(90−20)≈121.3°.

Based on this, according to the embodiments of the present disclosure, when the vehicle driving speed value meets the preset status parameter interval, the real-time angle of view of the rear-view camera of the vehicle is determined based on the obtained vehicle driving speed value and maximum and minimum values in the preset status parameter interval; or when the vehicle driving speed value does not meet the preset status parameter interval, the real-time angle of view of the rear-view camera is set to the maximum value or the minimum value. In the two manners, according to the embodiments of the present disclosure, a fixed angle of view of a rear-view camera is changed in a vehicle driving process, so as to help a driver or an autonomous driving vehicle better observe a surrounding driving environment, thereby improving driving safety.

It should be understood that the method for controlling a rear-view camera of a vehicle in the embodiments of the present disclosure is merely an example. A manner of controlling an angle of view of a rear-view camera based on a vehicle speed may be based on maximum and minimum values in a preset interval, or may not be based on a preset interval; may be based on a linear change of a vehicle speed in a preset interval, or may be based on non-linear transformation; and may be obtained through calculation based on a formula, or may be obtained in another manner. This is not strictly limited in the embodiments of the present disclosure.

Figure 10:
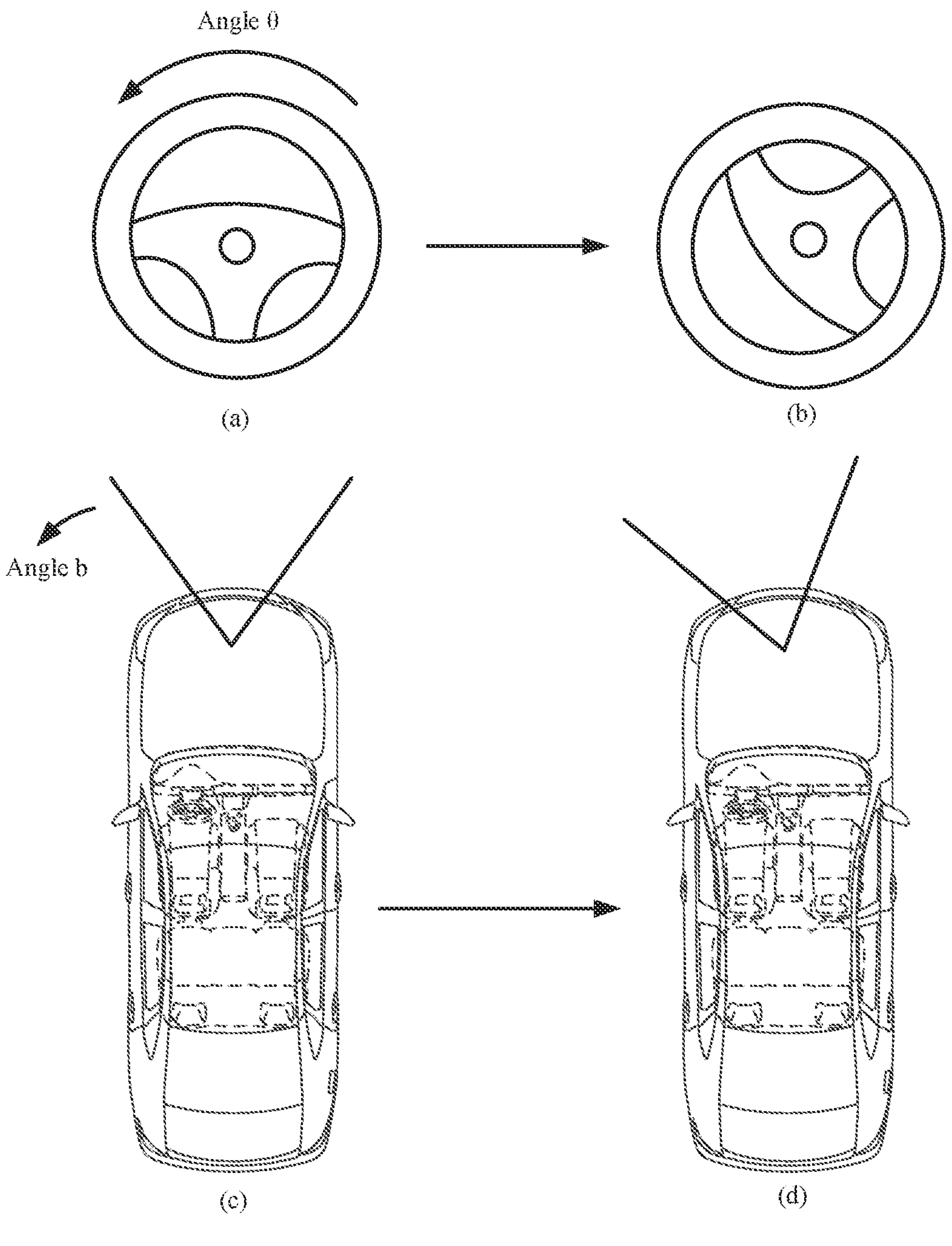
FIG. 10 is a schematic diagram of an angle of view of a front-view camera changing with a steering wheel angle in a vehicle steering process according to an embodiment of the present disclosure.

FIG. 10 is a schematic diagram of an angle of view of a front-view camera changing with a steering wheel angle in a vehicle steering process according to an embodiment of the present disclosure. FIG. 10 is a possible implementation of step S302 in FIG. 3.

In this implementation, the real-time status parameter includes a steering wheel angle of the vehicle; and the controlling the angle of view of the camera of the vehicle based on the real-time status parameter includes: if the steering angle is a counterclockwise-direction steering angle, controlling the angle of view of the camera of the vehicle to deflect leftward by an angle corresponding to the steering angle; or if the steering angle is a clockwise-direction steering angle, controlling the angle of view of the camera of the vehicle to deflect rightward by an angle corresponding to the steering angle, where a larger absolute value of the steering angle indicates a larger deflection angle.

As an example for description, in this embodiment of the present disclosure, that the angle of view of the camera of the vehicle deflects leftward or rightward by an angle may mean that the angle of view deflects leftward or rightward by an angle relative to a horizontal direction.

This embodiment is described below:

As shown in FIG. 10(*a*) to FIG. 10(*d*), when a steering wheel is being turned leftward (rightward), a range presented by a front-view angle of view moves leftward (rightward) at a uniform speed. After the steering wheel is turned to a maximum angle θ, a leftward (rightward) rotation angle b of the front-view angle of view reaches a maximum value and remains unchanged. In a process in which the steering wheel returns rightward (leftward), the front-view angle of view moves rightward (leftward) to an initial angle of view at a uniform speed.

In this manner, a fixed angle of view of a front-view camera is changed in a driving process in which a vehicle turns, so that safer visual information of a condition on a side of the vehicle can be provided.

Figure 11:
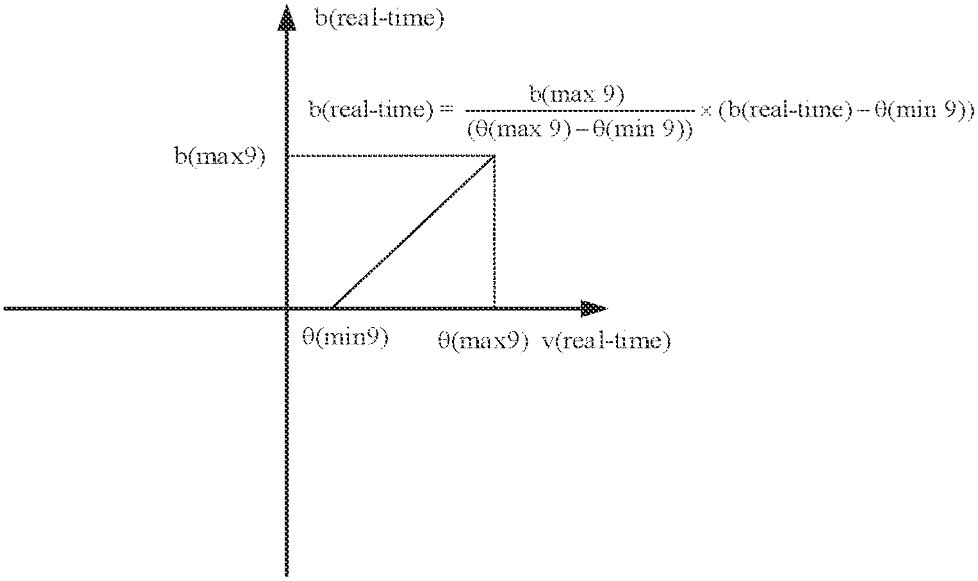
FIG. 11 is a function relationship diagram of an angle of view of a front-view camera of a vehicle changing with a steering wheel angle according to an embodiment of the present disclosure.

FIG. 11 is a function relationship diagram of an angle of view of a front-view camera of a vehicle changing with a steering wheel angle according to an embodiment of the present disclosure. FIG. 11 is a specific manner of controlling the angle of view of the front-view camera to change in FIG. 10.

As shown in FIG. 11, when the angle of view of the camera is switched to front view, linear transformation exists between the steering wheel rotation angle and the angle of view of the front-view camera in the preset status parameter interval, so as to implement change transition of the angle of view. A specific process of the change transition includes the following:

A range of an angle-of-view rotation angle b that is related to a steering wheel rotation angle change and that is of the front-view camera 9 is from 0 to b(max9), and a corresponding range, of a steering wheel angle θ, in which an angle-of-view change occurs is from θ(min9) to θ(max9).

When the real-time steering wheel angle θ meets a condition θ(min9)≤θ(real-time)≤θ(max9), the following is satisfied:

$$b(\text{real-time}) = \frac{b(\text{max9})}{(\theta(\text{max9}) - \theta(\text{min9}))} \times (\theta(\text{real-time}) - \theta(\text{min9}))$$

When the real-time steering wheel angle θ meets the following condition, b(real-time) is as follows:

When θ(real-time) is greater than θ(max9), b(real-time) is equal to b(max9).

When θ(real-time) is less than θ(min9), b(real-time) is equal to 0.

For example, if the range of the angle-of-view leftward/rightward rotation angle b that is related to a steering wheel rotation angle change and that is of the front-view camera 9 is from 0° to 60°, the corresponding range, of the steering wheel angle θ, in which an angle-of-view change occurs is from 30° to 150°.

When the real-time steering wheel angle θ meets a condition 30≤θ(real-time)≤150, the following is satisfied:

If θ(real-time) is equal to 120°, b(real-time) is as follows: b(real-time)−60/(150−30)×(120−30)=45°.

Based on the foregoing solution, according to the embodiments of the present disclosure, when a steering wheel rotation angle value meets the preset status parameter interval, the real-time angle of view of the front-view camera of the vehicle is determined based on the obtained steering wheel rotation angle value and maximum and minimum values in the preset status parameter interval; or when a steering wheel rotation angle value does not meet the preset status parameter interval, the real-time angle of view of the front-view camera is set to the maximum value or the minimum value. In the two manners, according to the embodiments of the present disclosure, a fixed angle of view of a front-view camera is changed in a vehicle driving process, so as to help a driver better observe a surrounding driving environment, thereby improving driving safety.

It should be understood that the method for controlling a front-view camera of a vehicle in the embodiments of the present disclosure is merely an example. A manner of controlling an angle of view of a camera based on a steering wheel angle may be based on maximum and minimum values in a preset interval, or may not be based on a preset interval; may be based on a linear change of a steering wheel angle value in a preset interval, or may be based on non-linear transformation; and may be obtained through calculation based on a formula, or may be obtained in another manner. This is not strictly limited in the embodiments of the present disclosure.

Figure 12:
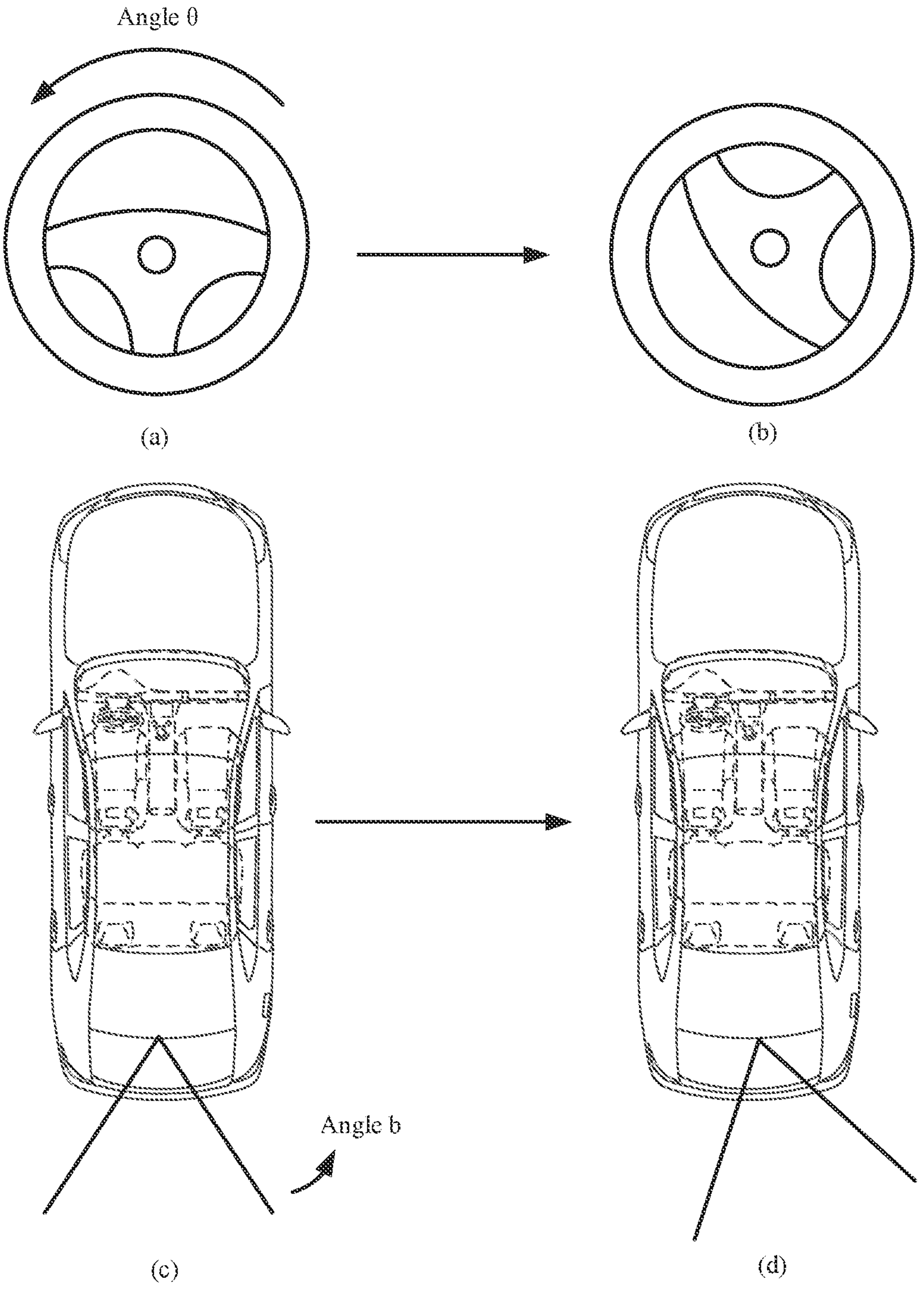
FIG. 12 is a schematic diagram of an angle of view of a rear-view camera changing with a steering wheel angle in a vehicle steering process according to an embodiment of the present disclosure.

FIG. 12 is a schematic diagram of an angle of view of a rear-view camera changing with a steering wheel angle in a vehicle steering process according to an embodiment of the present disclosure. FIG. 12 is a possible implementation of step S302 in FIG. 3.

In this implementation, the real-time status parameter includes a steering wheel angle of the vehicle; and the controlling the angle of view of the camera of the vehicle based on the real-time status parameter includes: if the steering angle is a counterclockwise-direction steering angle, controlling the angle of view of the camera of the vehicle to deflect leftward by an angle corresponding to the steering angle; or if the steering angle is a clockwise-direction steering angle, controlling the angle of view of the camera of the vehicle to deflect rightward by an angle corresponding to the steering angle, where a larger absolute value of the steering angle indicates a larger deflection angle.

This embodiment is described below:

As shown in FIG. 12(*a*) to FIG. 12(*d*), when a steering wheel is being turned leftward (rightward), a range presented by a rear-view angle of view moves rightward (leftward) at a uniform speed. After the steering wheel is turned to a maximum angle θ, a rightward (leftward) rotation angle b of the rear-view angle of view reaches a maximum value and remains unchanged. In a process in which the steering wheel returns leftward (rightward), the rear-view angle of view moves leftward (rightward) to an initial angle of view at a uniform speed.

In this manner, a fixed angle of view of a rear-view camera is changed in a driving process in which a vehicle turns, so that safer visual information of a condition on a side of the vehicle can be provided.

Figure 13:
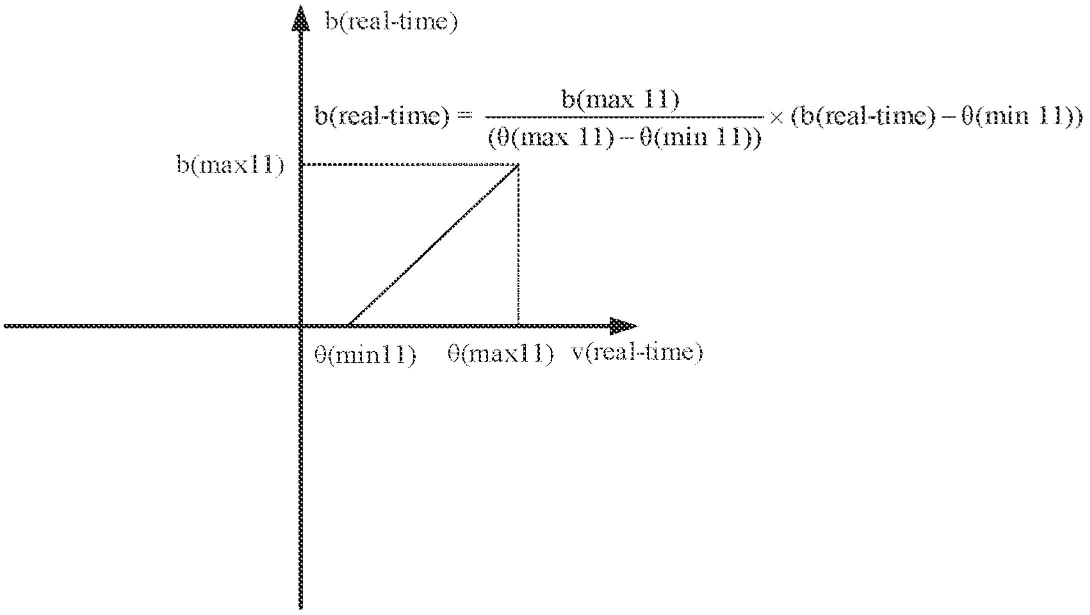
FIG. 13 is a function relationship diagram of an angle of view of a rear-view camera of a vehicle changing with a steering wheel angle according to an embodiment of the present disclosure.

FIG. 13 is a function relationship diagram of an angle of view of a rear-view camera of a vehicle changing with a steering wheel angle according to an embodiment of the present disclosure. FIG. 13 is a specific manner of controlling the angle of view of the rear-view camera to change in FIG. 12.

As shown in FIG. 13, when the angle of view of the camera is switched to rear view, linear transformation exists between the steering wheel rotation angle and the angle of view of the rear-view camera in the preset status parameter interval, so as to implement change transition of the angle of view. A specific process of the change transition includes the following:

A range of an angle-of-view rotation angle b that is related to a steering wheel rotation angle change and that is of the rear-view camera 11 is from 0 to b(max11), and a corresponding range, of a steering wheel angle θ, in which an angle-of-view change occurs is from θ(min11) to θ(max11).

When the real-time steering wheel angle θ meets a condition θ(min11)≤θ(real-time)≤θ(max11), the following is satisfied:

$$b(\text{real-time}) = \frac{b(\text{max11})}{(\theta(\text{max11}) - \theta(\text{min11}))} \times (\theta(\text{real-time}) - \theta(\text{min11}))$$

When the real-time steering wheel angle θ meets the following condition, b(real-time) is as follows:

When θ(real-time) is greater than θ(max11), b(real-time) is equal to b(max11).

When θ(real-time) is less than θ(min11), b(real-time) is equal to 0.

For example, if the range of the angle-of-view leftward/rightward rotation angle b that is related to a steering wheel rotation angle change and that is of the rear-view camera 11 is from 0° to 60°, the corresponding range, of the steering wheel angle θ, in which an angle-of-view change occurs is from 30° to 150°.

When the real-time steering wheel angle θ meets a condition 30≤θ(real-time)≤150, the following is satisfied:

If θ(real-time) is equal to 120°, b(real-time) is as follows: b(real-time)=60/(150−30)×(120−30)=45°.

Based on the foregoing solution, according to the embodiments of the present disclosure, when a steering wheel rotation angle value meets the preset status parameter interval, the real-time angle of view of the rear-view camera of the vehicle is determined based on the obtained steering wheel rotation angle value and maximum and minimum values in the preset status parameter interval; or when a steering wheel rotation angle value does not meet the preset status parameter interval, the real-time angle of view of the rear-view camera is set to the maximum value or the minimum value. In the two manners, according to the embodiments of the present disclosure, a fixed angle of view of a rear-view camera is changed in a vehicle driving process, so as to help a driver or an autonomous driving vehicle better observe a surrounding driving environment, thereby improving driving safety.

It should be understood that the method for controlling a rear-view camera of a vehicle in the embodiments of the present disclosure is merely an example. A manner of controlling an angle of view of a rear-view camera based on a steering wheel angle may be based on maximum and minimum values in a preset interval, or may not be based on a preset interval; may be based on a linear change of a steering wheel angle value in a preset interval, or may be based on non-linear transformation; and may be obtained through calculation based on a formula, or may be obtained in another manner. This is not strictly limited in the embodiments of the present disclosure.

Figure 14:
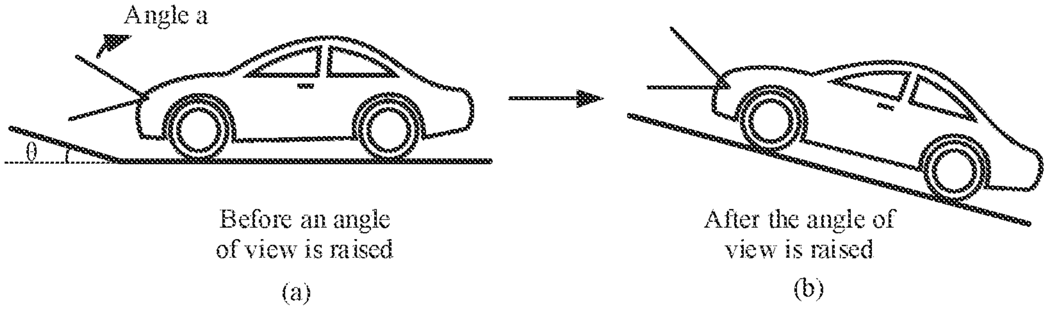
FIG. 14 is a schematic diagram of an angle-of-view change of a front-view camera in a process in which a vehicle runs uphill according to an embodiment of the present disclosure.

FIG. 14 is a schematic diagram of an angle-of-view change of a front-view camera in a process in which a vehicle runs uphill according to an embodiment of the present disclosure. FIG. 14 is a possible implementation of step S302 in FIG. 3.

In this implementation, the real-time status parameter includes an included angle between the vehicle and the horizontal plane; and the controlling the angle of view of the camera of the vehicle based on the real-time status parameter includes: when the included angle is a first included angle, controlling the angle of view of the camera of the vehicle to be a sixth angle of view; or when the included angle is a second included angle, controlling the angle of view of the camera of the vehicle to be a seventh angle of view, where the first included angle is less than the second included angle, and the sixth angle of view is higher than or equal to the seventh angle of view.

As an example for description, in the embodiments of the present disclosure, "an angle of view is higher than or equal to another angle of view" may mean a magnitude relationship between included angles between the horizontal plane and reference lines or reference planes (for example, lower sidelines, upper sidelines, median lines, or bisectors) of the angles of view. For example, the reference line is a median line. In this case, a larger included angle between a median line and the horizontal plane indicates a higher angle of view.

This embodiment is described below:

As shown in FIG. 14(*a*) and FIG. 14(*b*), a gradient of an upward slope in front of the vehicle is θ. In a process in which the vehicle runs uphill, an angle a by which an angle of view of the front-view camera is raised is calculated based on the real-time status parameter θ and the preset status parameter interval. The angle of view of the front-view camera is raised by the angle a at a uniform speed when the vehicle runs uphill.

In this manner, when the vehicle runs uphill, the angle of view of the front-view camera of the vehicle is controlled to be raised by a specific angle, so that safer visual information of a condition in front of the vehicle running uphill can be provided.

Figure 15:
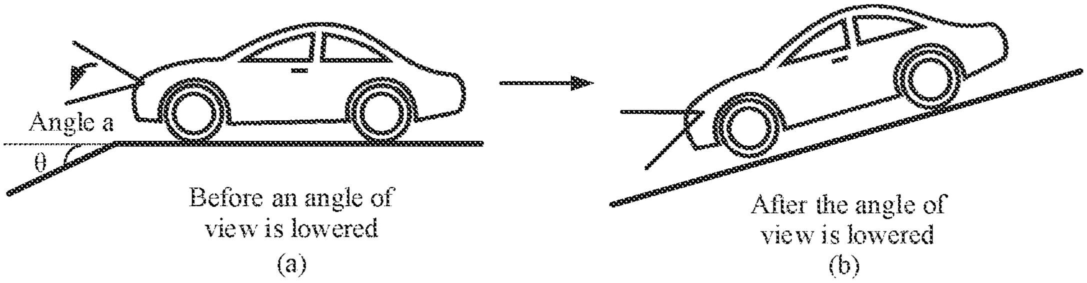
FIG. 15 is a schematic diagram of an angle-of-view change of a front-view camera in a process in which a vehicle runs downhill according to an embodiment of the present disclosure.

FIG. 15 is a schematic diagram of an angle-of-view change of a front-view camera in a process in which a vehicle runs downhill according to an embodiment of the present disclosure. FIG. 15 is a possible implementation of step S302 in FIG. 3.

As shown in FIG. 15(*a*) and FIG. 15(*b*), a gradient of a downward slope in front of the vehicle is θ. In a process in which the vehicle runs downhill, an angle a by which an angle of view of the front-view camera is lowered is calculated based on the real-time status parameter θ and the preset status parameter interval. The angle of view of the front-view camera is lowered by the angle a at a uniform speed when the vehicle runs downhill.

In this manner, when the vehicle runs downhill, the angle of view of the front-view camera of the vehicle is controlled to be lowered by a specific angle, so that safer visual information of a condition in front of the vehicle running downhill can be provided.

Figure 16:
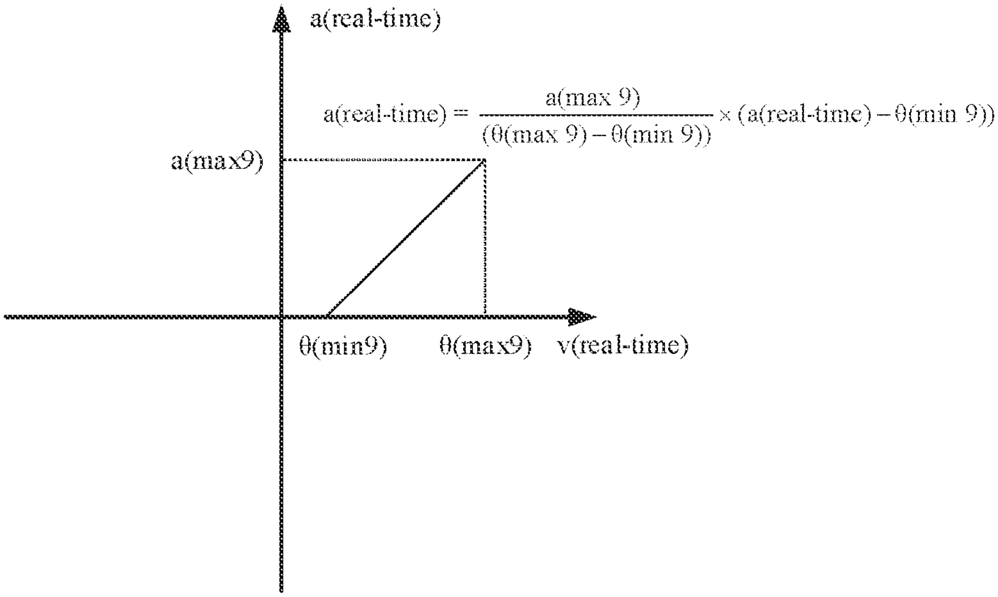
FIG. 16 is a function relationship diagram of an angle of view of a front-view camera of a vehicle changing with a gradient according to an embodiment of the present disclosure.

FIG. 16 is a function relationship diagram of an angle of view of a front-view camera of a vehicle changing with a gradient according to an embodiment of the present disclosure. FIG. 16 is a specific manner of controlling the angle of view of the front-view camera to change in FIG. 14 or FIG. 15.

As shown in FIG. 16, when the angle of view of the camera is switched to front view, linear transformation exists between a slope inclination angle and the angle of view of the front-view camera in the preset status parameter interval, so as to implement change transition of the angle of view. A specific process of the change transition includes the following:

An angle-of-view range that is related to a gradient angle change and that is of the front-view camera 9 is from 0 to a(max9), and a corresponding gradient angle range in which an angle-of-view change occurs is from θ(min9) to θ(max9).

When the real-time gradient θ(real-time) meets a condition θ(min9)≤θ(real-time)≤θ(max9), the following is satisfied:

$$a(\text{real-time}) = \frac{a(\max 9)}{(\theta(\max 9) - \theta(\min 9))} \times (\theta(\text{real-time}) - \theta(\min 9))$$

When the real-time angle θ(real-time) meets the following condition, a(real-time) is as follows:

When θ(real-time) is greater than θ(max9), a(real-time) is equal to a(max9).

When θ(real-time) is less than θ(min9), a(real-time) is equal to 0.

For example, if the angle-of-view range that is related to a gradient angle change and that is of the front-view camera 9 is from 0° to 16°, the corresponding gradient angle range in which an angle-of-view change occurs is from 0° to 8°.

When the real-time gradient θ(real-time) meets a condition 0≤θ(real-time)≤8, the following is satisfied:

If θ(real-time) is equal to 4°, b(real-time) is as follows: b(real-time)=16/(8−0)×(4−0)=8°.

Based on the foregoing solution, according to the embodiments of the present disclosure, when the included angle between the vehicle and the horizontal plane meets the preset status parameter interval, the real-time angle of view of the front-view camera of the vehicle is determined based on the obtained included angle between the vehicle and the horizontal plane and maximum and minimum values in the preset status parameter interval; or when the included angle between the vehicle and the horizontal plane does not meet the preset status parameter interval, the real-time angle of view of the front-view camera of the vehicle is set to the maximum value or the minimum value. In the two manners, according to the embodiments of the present disclosure, a fixed angle of view of a front-view camera is changed in a vehicle driving process, so as to help a driver or an intelligent-driving vehicle better observe a surrounding driving environment, thereby improving driving safety.

It should be understood that the method for controlling a front-view camera of a vehicle in the embodiments of the present disclosure is merely an example. A manner of controlling an angle of view of a front-view camera based on an included angle between a vehicle and a horizontal plane may be based on maximum and minimum values in a preset interval, or may not be based on a preset interval; may be based on a linear change of a steering wheel angle value in a preset interval, or may be based on non-linear transformation; and may be obtained through calculation based on a formula, or may be obtained in another manner. This is not strictly limited in the embodiments of the present disclosure.

Figure 17:
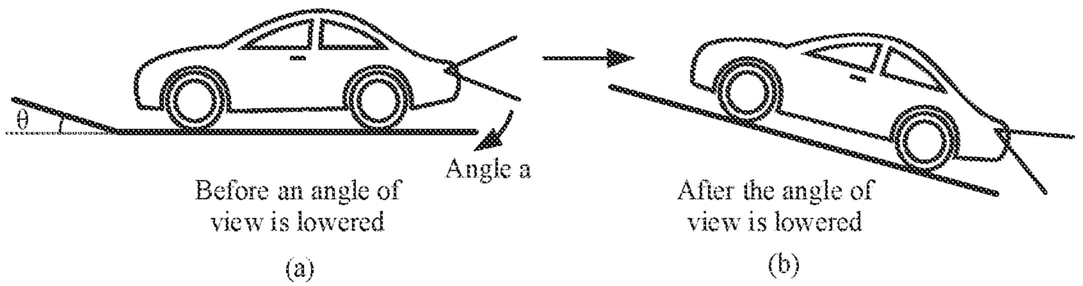
FIG. 17 is a schematic diagram of an angle-of-view change of a rear-view camera in a process in which a vehicle runs uphill according to an embodiment of the present disclosure.

FIG. 17 is a schematic diagram of an angle-of-view change of a rear-view camera in a process in which a vehicle runs uphill according to an embodiment of the present disclosure. FIG. 17 is a possible implementation of step S302 in FIG. 3.

In this implementation, the real-time status parameter includes an included angle between the vehicle and the horizontal plane; and the controlling the angle of view of the camera of the vehicle based on the real-time status parameter includes: when the included angle is a first included angle, controlling the angle of view of the camera of the vehicle to be a sixth angle of view; or when the included angle is a second included angle, controlling the angle of view of the camera of the vehicle to be a seventh angle of view, where the first included angle is less than the second included angle, and the sixth angle of view is higher than or equal to the seventh angle of view.

This embodiment is described below:

As shown in FIG. 17(*a*) and FIG. 17(*b*), a gradient of an upward slope in front of the vehicle is θ. In a process in which the vehicle runs uphill, an angle a by which an angle of view of the rear-view camera is raised is calculated based on the real-time status parameter θ and the preset status parameter interval. The angle of view of the rear-view camera is raised by the angle a at a uniform speed when the vehicle runs uphill.

In this manner, when the vehicle runs uphill, the angle of view of the rear-view camera of the vehicle is controlled to be raised by a specific angle, so that safer visual information of a condition behind the vehicle running uphill can be provided.

Figure 18:
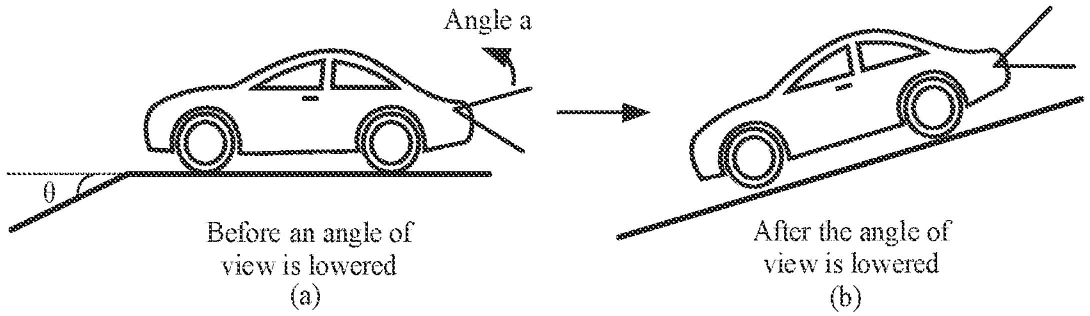
FIG. 18 is a schematic diagram of an angle-of-view change of a rear-view camera in a process in which a vehicle runs downhill according to an embodiment of the present disclosure.

FIG. 18 is a schematic diagram of an angle-of-view change of a rear-view camera in a process in which a vehicle runs downhill according to an embodiment of the present disclosure. FIG. 18 is a possible implementation of step S302 in FIG. 3.

As shown in FIG. 18(*a*) and FIG. 18(*b*), a gradient of a downward slope in front of the vehicle is θ. In a process in which the vehicle runs downhill, an angle a by which an angle of view of the rear-view camera is lowered is calculated based on the real-time status parameter θ and the preset status parameter interval. The angle of view of the rear-view camera is lowered by the angle a at a uniform speed when the vehicle runs downhill.

In this manner, when the vehicle runs downhill, the angle of view of the rear-view camera of the vehicle is controlled to be lowered by a specific angle, so that safer visual information of a condition behind the vehicle running downhill can be provided.

Figure 19:
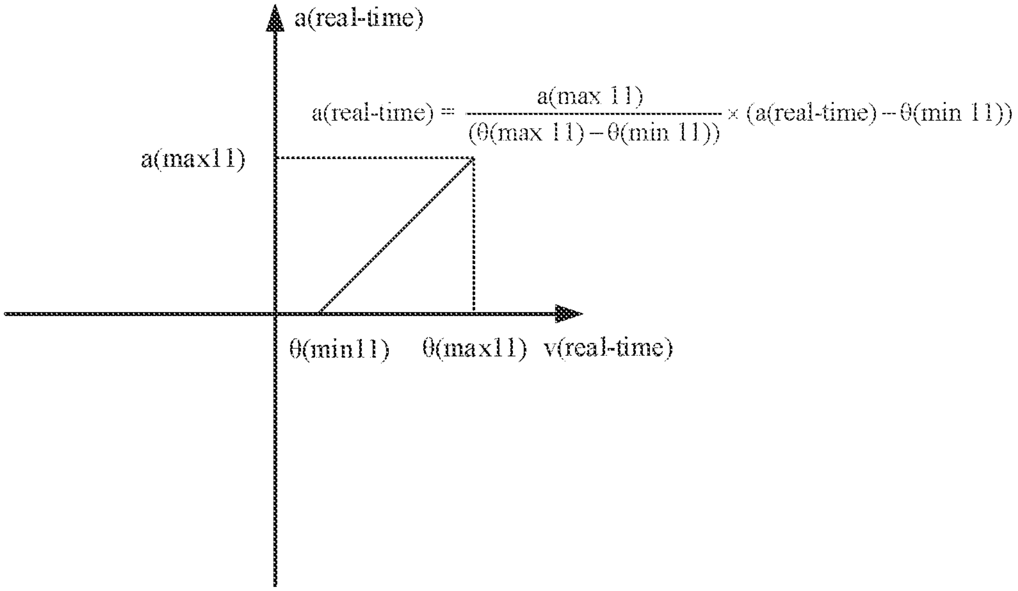
FIG. 19 is a function relationship diagram of an angle of view of a rear-view camera of a vehicle changing with a gradient according to an embodiment of the present disclosure.

FIG. 19 is a function relationship diagram of an angle of view of a rear-view camera of a vehicle changing with a gradient according to an embodiment of the present disclosure. FIG. 19 is a specific manner of controlling the angle of view of the rear-view camera to change in FIG. 17 or FIG. 18.

As shown in FIG. 19, when the angle of view of the camera is switched to rear view, linear transformation exists between a slope inclination angle and the angle of view of the rear-view camera in the preset status parameter interval, so as to implement change transition of the angle of view. A specific process of the change transition includes the following: An angle-of-view range that is related to a gradient angle change and that is of the rear-view camera 11 is from 0 to a(max11), and a corresponding gradient angle range in which an angle-of-view change occurs is from θ(min11) to θ(max11).

When the real-time gradient θ(real-time) meets a condition θ(min11)≤θ(real-time)≤θ(max11), the following is satisfied:

$$a(\text{real}-\text{time}) = \frac{a(\text{max}11)}{(\theta(\text{max}11) - \theta(\text{min}11))} \times (\theta(\text{real}-\text{time}) - \theta(\text{min}11))$$

That is, a(real-time) is as follows: a(real-time)=a(max11)/(θ(max11)−θ(min11))×(θ(real-time)−θ(min11)).

When the real-time angle θ(real-time) meets the following condition, a(real-time) is as follows:

When θ(real-time) is greater than θ(max11), a(real-time) is equal to a(max11).

When θ(real-time) is less than θ(min11), a(real-time) is equal to 0.

For example, if the angle-of-view range that is related to a gradient angle change and that is of the rear-view camera 11 is from 0° to 16°, the corresponding gradient angle range in which an angle-of-view change occurs is from 0° to 8°.

When the real-time gradient θ(real-time) meets a condition 0≤θ(real-time)≤8, the following is satisfied:

If θ(real-time) is equal to 4°, b(real-time) is as follows: b(real-time)=16/(8−0)×(4−0)=8°.

Based on the foregoing solution, according to the embodiments of the present disclosure, when the included angle between the vehicle and the horizontal plane meets the preset status parameter interval, the real-time angle of view of the rear-view camera of the vehicle is determined based on the obtained included angle between the vehicle and the horizontal plane and maximum and minimum values in the preset status parameter interval; or when the included angle between the vehicle and the horizontal plane does not meet the preset status parameter interval, the real-time angle of view of the rear-view camera of the vehicle is set to the maximum value or the minimum value. In the two manners, according to the embodiments of the present disclosure, a fixed angle of view of a rear-view camera is changed in a vehicle driving process, so as to help a driver better observe a surrounding driving environment, thereby improving driving safety.

It should be understood that the method for controlling a rear-view camera of a vehicle in the embodiments of the present disclosure is merely an example. A manner of controlling an angle of view of a rear-view camera based on an included angle between a vehicle and a horizontal plane may be based on maximum and minimum values in a preset interval, or may not be based on a preset interval; may be based on a linear change of a steering wheel angle value in a preset interval, or may be based on non-linear transformation; and may be obtained through calculation based on a formula, or may be obtained in another manner. This is not strictly limited in the embodiments of the present disclosure.

It should be further understood that the embodiments described in this specification may be independent solutions, or may be combined based on internal logic. These solutions all fall within the protection scope of the present disclosure. For example, the method for changing an angle of view in a vehicle acceleration process may be used in combination with the method for changing an angle of view in a process in which a vehicle runs uphill, or may be used independently. For another example, the method for changing an angle of view in a vehicle deceleration process may be separately used, or may be used in combination with the method for changing an angle of view in a vehicle steering process.

Figure 20:
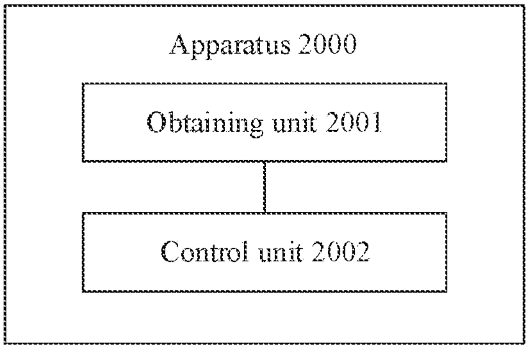
FIG. 20 is a schematic block diagram of an apparatus for controlling an angle of view of a vehicle-mounted camera according to an embodiment of the present disclosure.

FIG. 20 is a schematic block diagram of an apparatus for controlling an angle of view of a vehicle-mounted camera according to an embodiment of the present disclosure.

The apparatus 2000 includes an obtaining unit 2001 and a control unit 2002. The obtaining unit 2001 may implement a corresponding communication function, and the control unit 2002 is configured to perform data processing.

In some embodiments, the apparatus 2000 may further include a storage unit. The storage unit may be configured to store instructions and/or data, and the control unit 2002 may read the instructions and/or data in the storage unit, so that the apparatus implements the foregoing method embodiment.

The apparatus 2000 may include units configured to perform FIG. 3. In addition, the units in the apparatus 2000 and the foregoing other operations and/or functions are respectively used for implementing corresponding procedures of the method embodiment in FIG. 3.

When the apparatus 2000 is configured to perform the method 300 in FIG. 3, the obtaining unit 2001 may be configured to perform step S301 in the method 300, and the control unit 2002 may be configured to perform step S302 in the method 300.

In some embodiments, the obtaining unit 2001 is configured to obtain a real-time status parameter of a vehicle, where the real-time status parameter is used to indicate a driving status of the vehicle. The control unit 2002 is configured to control the angle of view of the camera of the vehicle based on the real-time status parameter.

In a possible implementation, the control unit 2002 is configured to: control the angle of view of the camera of the vehicle based on the real-time status parameter and a preset status parameter interval.

In a possible implementation, the status parameter interval includes a minimum value and a maximum value, the minimum value corresponds to a first angle of view of the camera, and the maximum value corresponds to a second angle of view of the camera; and the control unit 2002 is configured to: if a value of the real-time status parameter is less than or equal to the minimum value, control the angle of view of the camera of the vehicle to be the first angle of view; or if a value of the real-time status parameter is greater than or equal to the maximum value, control the angle of view of the camera of the vehicle to be the second angle of view; or if a value of the real-time status parameter is greater than the minimum value and less than the maximum value, control the angle of view of the camera of the vehicle to be a third angle of view, where the third angle of view is obtained by performing linear interpolation on the first angle of view and the second angle of view based on the value of the real-time status parameter, the minimum value, and the maximum value.

In a possible implementation, the apparatus 2000 may further include a receiving unit and a configuration unit, where the receiving unit is configured to receive configuration information of the status parameter interval; and the configuration unit is configured to configure the status parameter interval based on the configuration information of the status parameter interval.

In a possible implementation, the real-time status parameter includes a vehicle speed of the vehicle, and the control unit 2002 is configured to: when the vehicle speed of the vehicle is a first vehicle speed, control the angle of view of the camera of the vehicle to be a fourth angle of view; or when the vehicle speed of the vehicle is a second vehicle speed, control the angle of view of the camera of the vehicle to be a fifth angle of view, where the first vehicle speed is lower than the second vehicle speed, and the fourth angle of view is less than or equal to the fifth angle of view.

In a possible implementation, the real-time status parameter includes an included angle between the vehicle and a horizontal plane; and the control unit 2002 is configured to: when the included angle is a first included angle, control the angle of view of the camera of the vehicle to be a sixth angle of view; or when the included angle is a second included angle, control the angle of view of the camera of the vehicle to be a seventh angle of view, where the first included angle is less than the second included angle, and the sixth angle of view is higher than or equal to the seventh angle of view.

In a possible implementation, the real-time status parameter includes a steering wheel angle of the vehicle; and the control unit 2002 is configured to: if the steering angle is a counterclockwise-direction steering angle, control the angle of view of the camera of the vehicle to deflect leftward by an angle corresponding to the steering angle; or if the steering angle is a clockwise-direction steering angle, control the angle of view of the camera of the vehicle to deflect rightward by an angle corresponding to the steering angle, where a larger absolute value of the steering angle indicates a larger deflection angle.

In a possible implementation, the status parameter interval includes at least one of the following intervals: a speed interval of the vehicle, a steering wheel angle interval of the vehicle, and an included-angle interval between the vehicle and the horizontal plane.

In a possible implementation, the camera is a front-view camera or rear-view camera of the vehicle.

It should be understood that a specific process in which each unit performs the foregoing corresponding step is described in detail in the foregoing method embodiment. For brevity, details are not described herein again.

It should be further understood that the control unit in FIG. 20 may be implemented by at least one processor or a processor-related circuit, the obtaining unit and a transceiver unit may be implemented by a transceiver or a transceiver-related circuit, and the storage unit may be implemented by at least one memory.

Figure 21:
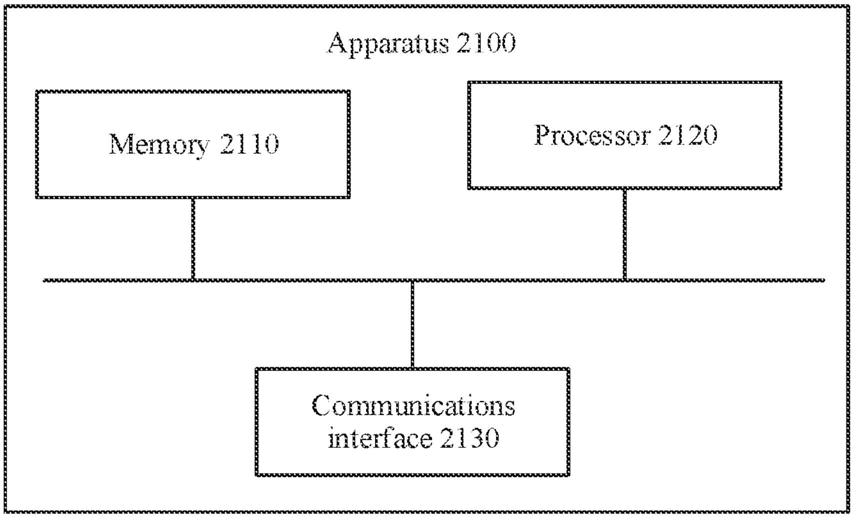
FIG. 21 is another schematic block diagram of an apparatus for controlling an angle of view of a vehicle-mounted camera according to an embodiment of the present disclosure.

FIG. 21 is another schematic block diagram of an apparatus for controlling an angle of view of a vehicle-mounted camera according to an embodiment of the present disclosure.

The apparatus includes a memory 2110, a processor 2120, and a communications interface 2130. The memory 2110, the processor 2120, and the communications interface 2130 are connected to each other by using an internal connection path. The memory 2110 is configured to store instructions. The processor 2120 is configured to execute the instructions stored in the memory 2120, to control the input/output interface 2130 to receive/send at least some of parameters of a second channel model. In some embodiments, the memory 2110 may be coupled to the processor 2120 through an interface, or may be integrated with the processor 2120.

It should be noted that, by way of example rather than limitation, a transceiver apparatus such as a transceiver is used for the communications interface 2130, to implement communication between the communications device 2100 and another device or a communications network. The communications interface 2130 may further include an input/output interface.

In an implementation process, the steps of the foregoing method may be implemented by an integrated logic circuit of hardware in the processor 2120, or by using instructions in a form of software. The method disclosed with reference to the embodiments of the present disclosure may be directly implemented by a hardware processor, or may be implemented by using a combination of hardware in the processor and a software module. The software module may be located in a storage medium mature in the art, such as a random access memory, a flash memory, a read-only memory, a programmable read-only memory, an electrically erasable programmable memory, or a register. The storage medium is located in the memory 2110, and the processor 2120 reads information in the memory 2110, and completes the steps of the foregoing method in combination with hardware of the processor. To avoid repetition, details are not described herein again.

It should be understood that, in the embodiments of the present disclosure, the processor may be a CPU, or the processor may be another general purpose processor, a digital signal processor (DSP), an ASIC, an FPGA or another programmable logic device, a discrete gate or transistor logic device, a discrete hardware component, or the like. The general purpose processor may be a microprocessor, or the processor may be any conventional processor or the like.

It should be further understood that, in the embodiments of the present disclosure, the memory may include a read-only memory and a random access memory, and provide instructions and data for the processor. A part of the processor may further include a non-volatile random access memory. For example, the processor may further store device type information.

It should be understood that the term "and/or" in this specification describes only an association relationship between associated objects and represents that three relationships may exist. For example, A and/or B may represent the following three cases: Only A exists, both A and B exist, and only B exists. In addition, the character "/" in this specification generally indicates an "or" relationship between associated objects.

It should be understood that, in various embodiments of the present disclosure, sequence numbers of the foregoing processes do not indicate execution sequences. Execution sequences of the processes should be determined based on functions and internal logic of the processes, and shall not constitute any limitation on an implementation process of the embodiments of the present disclosure.

An embodiment of the present disclosure further provides a computer-readable medium. The computer-readable medium stores program code. When the computer program code is run on a computer, the computer is enabled to perform any method in FIG. 3 to FIG. 19.

An embodiment of the present disclosure further provides a chip. The chip includes at least one processor and a memory. The at least one processor is coupled to the memory, and is configured to read and execute instructions in the memory to perform any method in FIG. 3 to FIG. 19.

An embodiment of the present disclosure further provides an autonomous driving vehicle. The autonomous driving vehicle includes at least one processor and a memory. The at least one processor is coupled to the memory, and is configured to read and execute instructions in the memory to perform any method in FIG. 3 to FIG. 19.

Terms such as "component" and "module" used in this specification are used to represent computer-related entities, hardware, firmware, combinations of hardware and software, software, or software being executed. For example, a component may be but is not limited to a process that is run on a processor, a processor, an object, an executable file, an execution thread, a program, and/or a computer. As shown in the figure, both an application that is run on a computing device and the computing device may be components. One or more components may reside in a process and/or an execution thread, and the components may be located on one computer and/or distributed on two or more computers. In addition, these components may be executed from various computer-readable media that store various data structures. For example, the components may communicate by using a local process and/or a remote process and based on a signal having one or more data packets (for example, data from two components interacting with another component in a local system, a distributed system, and/or a network, for example, the Internet interacting with another system by using a signal).

A person of ordinary skill in the art may be aware that units and algorithm steps described as examples with reference to the embodiments disclosed in this specification can be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of the present disclosure.

It can be clearly understood by a person skilled in the art that, for ease and brevity of description, for specific working processes of the foregoing apparatuses and units, reference may be made to corresponding processes in the foregoing method embodiments.

In the several embodiments provided in the present disclosure, it should be understood that the disclosed apparatus and method may be implemented in other manners. For example, the described apparatus embodiment is merely an example. For example, division into the units is merely logical function division, and there may be another division manner during actual implementation. For example, a plurality of units or components may be combined or may be integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electrical, mechanical, or other forms.

The units described as separate components may be or may not be physically separate, and components displayed as units may be or may not be physical units, and may be located in one position, or may be distributed on a plurality of network units. Some or all of the units may be selected based on an actual requirement to achieve the objectives of the solutions in the embodiments.

In addition, functional units in the embodiments of the present disclosure may be integrated into one control unit, or each of the units may exist alone physically, or two or more units may be integrated into one unit.

When the function is implemented in a form of a software function unit and is sold or used as an independent product, the function may be stored in a computer-readable storage medium. Based on such an understanding, the technical solutions in the present disclosure essentially, or the part contributing to a conventional technology, or a part of the technical solutions may be implemented in a form of a software product. The computer software product is stored in a storage medium, and includes several instructions for instructing a computer device (which may be a personal computer, a server, a network device, or the like) to perform all or some of the steps of the method in the embodiments of the present disclosure. The foregoing storage medium includes any medium that can store program code, such as a Universal Serial Bus (USB) flash drive, a removable hard disk, a read-only memory (ROM), a random-access memory (RAM), a magnetic disk, or an optical disc.

The foregoing descriptions are merely specific implementations of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A method comprising:

obtaining a real-time status parameter of a vehicle, wherein the real-time status parameter indicates a real-time driving status of the vehicle, and wherein the real-time status parameter comprises an included angle between the vehicle and a horizontal plane; and controlling an angle of a field of view of a vehicle-mounted camera of the vehicle, wherein controlling the angle of the field of view comprises:

controlling, when the included angle is a first included angle, the angle of the field of view to be a first angle of the field of view;

controlling, when the included angle is a second included angle, the angle of the field of view to be a second angle of the field of view, wherein the first included angle is less than the second included angle, and wherein the first angle of the field of view is greater than or equal to the second angle of the field of view; and controlling, when the vehicle is operating in at least one of a nighttime condition, a rain condition, a snow condition, or a haze condition, the angle of the field of view based on an expanded angle of a field of view change range, wherein the expanded angle of the field of view change range is obtained by multiplying a normal angle of the field of view change range by a coefficient greater than one.

2. The method of claim 1, wherein controlling the angle of the field of view further comprises controlling the angle of the field of view based on a preset status parameter interval.

3. The method of claim 2, wherein the preset status parameter interval comprises a minimum value and a maximum value, wherein the minimum value corresponds to a third angle of the field of view, wherein the maximum value corresponds to a fourth angle of the field of view, and wherein controlling the angle of the field of view based on the preset status parameter interval comprises controlling, when a value of the real-time status parameter is less than or equal to the minimum value, the angle of the field of view to be the third angle of the field of view.

4. The method of claim 2, further comprising:

receiving configuration information of the preset status parameter interval; and configuring the preset status parameter interval based on the configuration information.

5. The method of claim 2, wherein the preset status parameter interval comprises at least one of the following intervals: a speed interval of the vehicle, a steering wheel angle interval of the vehicle, or an included-angle interval between the vehicle and the horizontal plane.

6. The method of claim 1, wherein the real-time status parameter further comprises a vehicle speed of the vehicle, and wherein controlling the angle of the field of view further comprises controlling, when the vehicle speed of the vehicle is a first vehicle speed, the angle of the field of view to be a sixth angle of the field of view.

7. The method of claim 1, wherein the real-time status parameter further comprises a steering wheel angle of the vehicle, and wherein controlling the angle of the field of view further comprises:

controlling, when the steering wheel angle is a counter-clockwise-direction steering angle, the angle of the field of view to deflect leftward by an angle corresponding to the steering wheel angle; and controlling, when the steering wheel angle is a clockwise-direction steering angle, the angle of the field of view to deflect rightward by the angle corresponding to the steering wheel angle, wherein a larger absolute value of the steering wheel angle indicates a larger deflection angle.

8. An apparatus comprising:

a memory configured to store instructions; and one or more processors coupled to the memory and configured to execute the instructions to cause the apparatus to:

obtain a real-time status parameter of a vehicle, wherein the real-time status parameter indicates a driving status of the vehicle, and wherein the real-time status parameter comprises an included angle between the vehicle and a horizontal plane; and control an angle of a field of view of a vehicle-mounted camera of the vehicle, wherein the one or more processors are further configured to execute the instructions to cause the apparatus to control the angle of the field of view by:

controlling, when the included angle is a first included angle, the angle of the vehicle-mounted camera to be at a first angle of the field of view;

controlling, when the included angle is a second included angle, the angle of the vehicle-mounted camera to be at a second angle of the field of view, wherein the first included angle is less than the second included angle, and wherein the first angle of the field of view is greater than or equal to the second angle of the field of view; and controlling, when the vehicle is operating in at least one of a nighttime condition, a rain condition, a snow condition, or a haze condition, the angle of the field of view based on an expanded angle of a field of view change range, wherein the expanded angle of the field of view change range is obtained by multiplying a normal angle of the field of view change range by a coefficient greater than one.

9. The apparatus of claim 8, wherein the one or more processors are further configured to execute the instructions to cause the apparatus to control the angle of the field of view based on a preset status parameter interval.

10. The apparatus of claim 9, wherein the preset status parameter interval comprises a minimum value and a maximum value, wherein the minimum value corresponds to a third angle of the field of view, wherein the maximum value corresponds to a fourth angle of the field of view, and wherein the one or more processors are further configured to execute the instructions to cause the apparatus to:

control, when a second value of the real-time status parameter is greater than or equal to the maximum value, the angle of the field of view to be the fourth angle of the field of view.

11. The apparatus of claim 9, wherein the one or more processors are further configured to execute the instructions to cause the apparatus to:

receive configuration information of the preset status parameter interval; and configure the preset status parameter interval based on the configuration information.

12. The apparatus of claim 9, wherein the preset status parameter interval comprises at least one of the following intervals: a speed interval of the vehicle, a steering wheel angle interval of the vehicle, or an included-angle interval between the vehicle and the horizontal plane.

13. The apparatus of claim 8, wherein the real-time status parameter further comprises a vehicle speed of the vehicle, and wherein the one or more processors are further configured to execute the instructions to cause the apparatus to:

control, when the vehicle speed of the vehicle is a second vehicle speed, the angle of the field of view to be a seventh angle of the field of view, wherein a first vehicle speed is lower than the second vehicle speed, and wherein a sixth angle of the field of view is less than or equal to the seventh angle of the field of view.

14. The apparatus of claim 8, wherein the real-time status parameter further comprises a steering wheel angle of the vehicle; and the one or more processors are further configured to execute the instructions to cause the apparatus to:

control, when the steering wheel angle is a counterclockwise-direction steering angle, the angle of the field of view to deflect leftward by a first deflection angle corresponding to the steering wheel angle; and control, when the steering wheel angle is a clockwise-direction steering angle, the angle of the field of view to deflect rightward by a second deflection angle corresponding to the steering wheel angle, wherein a larger absolute value of the steering wheel angle indicates a larger deflection angle.

15. A computer program product comprising computer program instructions that, when executed by one or more processors, cause an apparatus to:

obtain a real-time status parameter of a vehicle, wherein the real-time status parameter indicates a driving status of the vehicle, and wherein the real-time status parameter comprises an included angle between the vehicle and a horizontal plane; and control an angle of a field of view of a vehicle-mounted camera of the vehicle, wherein the computer program instructions, when executed by the one or more processors, further cause the apparatus to control the angle of the field of view by:

controlling, when the included angle is a first included angle, the angle of the vehicle-mounted camera to be at a first angle of the field of view;

controlling, when the included angle is a second included angle, the angle of the vehicle-mounted camera to be at a second angle of the field of view, wherein the first included angle is less than the second included angle, and wherein the first angle of the field of view is greater than or equal to the second angle of the field of view; and controlling, when the vehicle is operating in at least one of a nighttime condition, a rain condition, a snow condition, or a haze condition, the angle of the field of view based on an expanded angle of a field of view change range, wherein the expanded angle of the field of view change range is obtained by multiplying a normal angle of the field of view change range by a coefficient greater than one.

16. The computer program product of claim 15, wherein the computer program instructions, when executed by the one or more processors, further cause the apparatus to execute the instructions to cause the apparatus to control the angle of the field of view based on a preset status parameter interval.

17. The computer program product of claim 16, wherein the preset status parameter interval comprises a minimum value and a maximum value, wherein the minimum value corresponds to a third angle of the field of view, wherein the maximum value corresponds to a fourth angle of the field of view, and wherein the computer program instructions, when executed by the one or more processors, further cause the apparatus to:

control, when a second value of the real-time status parameter is greater than or equal to the maximum value, the angle of the field of view to be the fourth angle of the field of view.

18. The computer program product of claim 16, wherein the computer program instructions, when executed by the one or more processors, further cause the apparatus to:

receive configuration information of the preset status parameter interval; and configure the preset status parameter interval based on the configuration information.

19. The computer program product of claim 16, wherein the preset status parameter interval comprises at least one of the following intervals: a speed interval of the vehicle, a steering wheel angle interval of the vehicle, or an included-angle interval between the vehicle and the horizontal plane.

20. The computer program product of claim 15, wherein the real-time status parameter further comprises a vehicle speed of the vehicle, and wherein the computer program instructions, when executed by the one or more processors, further cause the apparatus to:

control, when the vehicle speed of the vehicle is a second vehicle speed, the angle of the field of view to be a seventh angle of the field of view, wherein a first vehicle speed is lower than the second vehicle speed, and wherein a sixth angle of the field of view is less than or equal to the seventh angle of the field of view.

* * * * *